United States Patent [19]
Ishikawa et al.

[11] Patent Number: 5,726,768
[45] Date of Patent: Mar. 10, 1998

[54] IMAGE COMMUNICATION APPARATUS HAVING IMPROVED CONVERSION AND TRANSFER CONTROL OF IMAGE DATA

[75] Inventors: Yuji Ishikawa, Yokohama; Motoaki Yoshino, Kawasaki; Masao Kiguchi, Yokohama; Masaya Kondo, Kawasaki; Atsushi Ohtani, Tokyo; Kazuomi Oishi, Yokohama, all of Japan

[73] Assignee: Canon Kabushiki Kaisha, Tokyo, Japan

[21] Appl. No.: 165,502

[22] Filed: Dec. 13, 1993

[30] Foreign Application Priority Data

Dec. 16, 1992 [JP] Japan ................................. 4-336176

[51] Int. Cl.$^6$ ........................... H04N 1/21; H04N 1/32
[52] U.S. Cl. ..................... 358/442; 358/444; 358/468
[58] Field of Search ............................ 358/442, 448, 358/468, 404, 444; 395/114, 115

[56] References Cited

U.S. PATENT DOCUMENTS

| 4,843,479 | 6/1989 | Yoshino et al. |         |
|-----------|--------|----------------|---------|
| 5,041,918 | 8/1991 | Ishida et al.  | 358/442 |
| 5,193,169 | 3/1993 | Ishikawa.      |         |
| 5,239,389 | 8/1993 | Kochis et al.  | 358/451 |

*Primary Examiner*—Scott A. Rogers
*Attorney, Agent, or Firm*—Fitzpatrick, Cella, Harper & Scinto

[57] ABSTRACT

An image communication apparatus converts image data received through a communication line into bit image data to be reproduced as a visible image by means of using a data converting unit and a reproducing unit. The apparatus converts data from a data processing apparatus into bit image data to be reproduced as a visible image by means of using the data converting unit and the reproducing unit, so as to accomplish an efficient system as a whole.

17 Claims, 34 Drawing Sheets

FIG.24A

| '92 07/21 | 17:15 |
| F/T | CONF 03 |

○ FACSIMILE
● PRINTER
● SCANNER

FIG.24B

00 PRINTER READY
ON LINE

● FACSIMILE
○ PRINTER
● SCANNER

FIG.24C

SCANNER READY

● FACSIMILE
● PRINTER
○ SCANNER

FIG.24D

RECEIVE
TX/RX NO.          0248

○ FACSIMILE
● PRINTER
● SCANNER

FIG.24E

00 PRINTING
ON LINE

● FACSIMILE
○ PRINTER
● SCANNER

FIG.24F

SCANNING

● FACSIMILE
● PRINTER
○ SCANNER

FIG.24G

'92 07/21        17:15
PC DATA PRINTING

○ FACSIMILE
● PRINTER
● SCANNER

FIG.24H

RECEIVE
TX/RX NO.          0252

● FACSIMILE
○ PRINTER
● SCANNER

○ TURN ON
● TURN ON AND OFF
● TURN OFF

IMAGE COMMUNICATION APPARATUS HAVING IMPROVED CONVERSION AND TRANSFER CONTROL OF IMAGE DATA

BACKGROUND OF THE INVENTION

1. Field of the Invention

The present invention relates no an image communication apparatus capable of reproducing data from a data processing apparatus.

2. Related Background Art

A printer controller or a printing system converts code data from a host (a computer, a personal computer etc.) into a bit map image, and causes a recorder (e.g. a page printer) to record the bit map image.

On the other hand, one conventional facsimile apparatus codes read image data, and transmits the coded data. The facsimile apparatus also converts received coded data into a bit image by decoding it, and causes a recording unit (e.g. a page printer) to record the bit image.

In some offices, those printing system and facsimile apparatus as described above are individually used. However, each such printing system and facsimile apparatus has a printing unit, and each printing unit is used for only a facsimile or for only a printing system. Therefore, in some offices which need both facsimile and printing functions, to individually own the facsimile apparatus and the printing system is not effective.

SUMMARY OF THE INVENTION

In consideration of the foregoing, an object of the present invention is to provide an improvement in this type of image communication apparatus.

Another object of the present invention is to provide an image communication apparatus capable of effectively reproducing image data received in data communication and data from a data processing terminal.

These and other objects are accomplished by providing an image communication apparatus comprising data converting means for converting image data received in data communication and data sent from a data processing terminal into bit map image data, and reproducing means for reproducing the bit map image data.

Still other objects of the present invention, and the advantages thereof, will become fully apparent from the following description of the preferred embodiments to be taken in conjunction with the attached drawings.

BRIEF DESCRIPTION OF THE DRAWINGS

FIGS. 24 (a)-(h) are views showing examples of display by a LCD.

DETAILED DESCRIPTION OF THE PREFERRED EMBODIMENT

Now the present invention will be clarified in detail by an embodiment thereof shown in the attached drawings.

Figure 1:
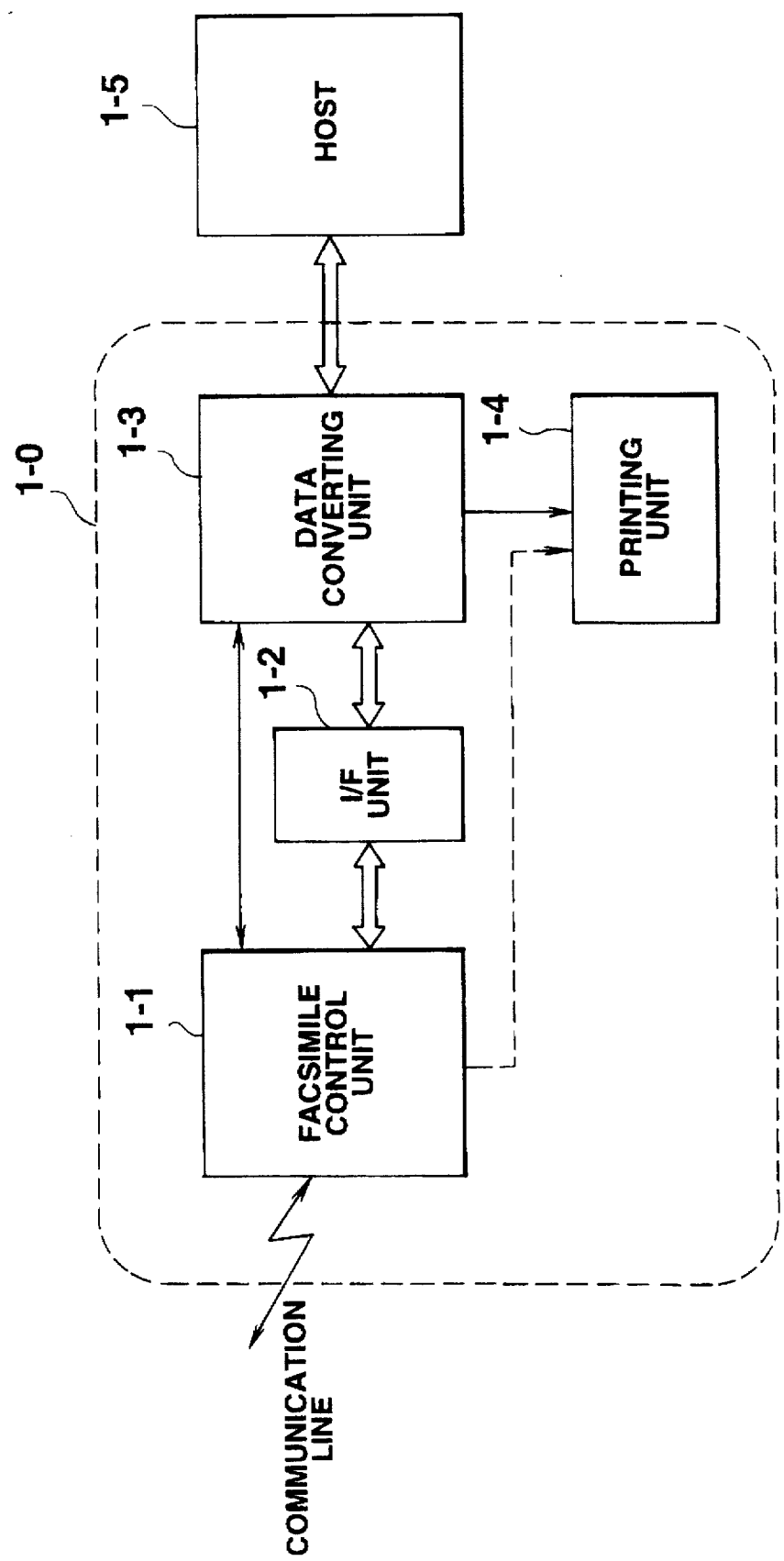
FIG. 1 is a block diagram showing a structure of an image communication apparatus according to the present invention.

FIG. 1 is a block diagram of a facsimile apparatus according to the embodiment of the present invention.

A facsimile control unit 1-1 is provided for controlling a communication operation via a communication line, and for sending and receiving commands and data to and from a data converting unit 1-3 through an I/F (Interface) unit 1-2. Further, the facsimile control unit 1-1 has a video I/F to a printing unit 1-4, and directly controls a recording operation of the printing unit 1-4.

The I/F unit 1-2 is provided for managing commands and data communicated between the facsimile control unit 1-1 and the data converting unit 1-3.

The data converting unit 1-3 is provided for communicating commands and data with a data processing terminal 1-5. The data converting unit 1-3 includes a video I/F to the printing unit 1-4, and controls a recording operation of the printing unit 1-4. Further, the data converting unit 1-3 converts character data (code data) from the data processing terminal 1-5 into bit map image.

The printing unit 1-4 is provided for recording a bit map image (data to be printed) from the data converting unit 1-3 on a recording material.

The data processing terminal 1-5 is a host computer (e.g. personal computer), and sends image data (e.g. data described by Page Description Language (PDL)) to the data converting unit 1-3.

Figure 2:
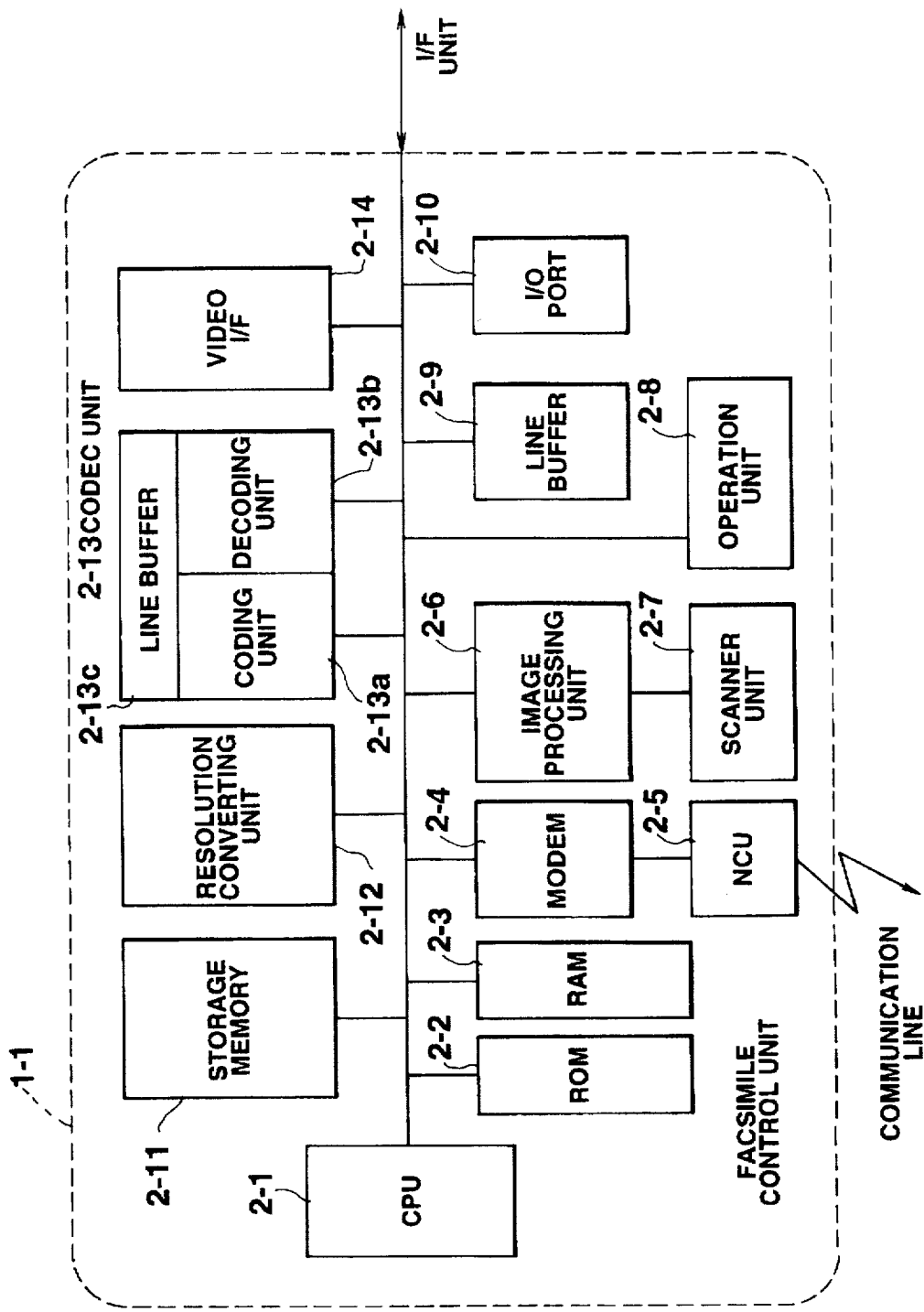
FIG. 2 is a block diagram showing a structure of a facsimile control unit.

FIG. 2 is a block diagram of the facsimile control unit 1-1 (FIG. 1).

A CPU 2-1 is provided for controlling the facsimile control unit 1-1.

A ROM 2-2 is provided for storing an operation program of the CPU 2-1.

A RAM 2-3 is used as a work area by the CPU 2-1.

A modem 2-4 is provided for modulating and demodulating communication data.

A NCU 2-5 is provided for controlling a connection of a communication line.

An image processing unit 2-6 is provided for processing image data of an original document read by a scanner 2-7.

An operation unit 2-8 is provided for inputting key commands by an operator, and for displaying the condition of the facsimile system.

A line buffer 2-9 is provided for momentarily storing image data to be communicated with the I/F unit 1-2.

An I/O port 2-10 is provided for managing the inputting of signals from sensors (unshown) and outputting of signals to peripheral units.

A storage memory 2-11 is provided for storing image data.

A resolution converting unit 2-12 is provided for converting a pixel density of image data so as to equalize a pixel density of image data to be processed by the facsimile control unit 1-1 with a pixel density of image data processed by the data converting unit 2-12.

A codec unit 2-13 is provided for coding image data and for decoding code data (image data). The codec unit 2-13 includes a coding unit 2-13a for coding image data, a decoding unit 2-13b for decoding code data (image data), and an internal line buffer 2-13c for storing image data.

A video I/F 2-14 is provided for communicating image data with the data converting unit 1-3.

Figure 3:
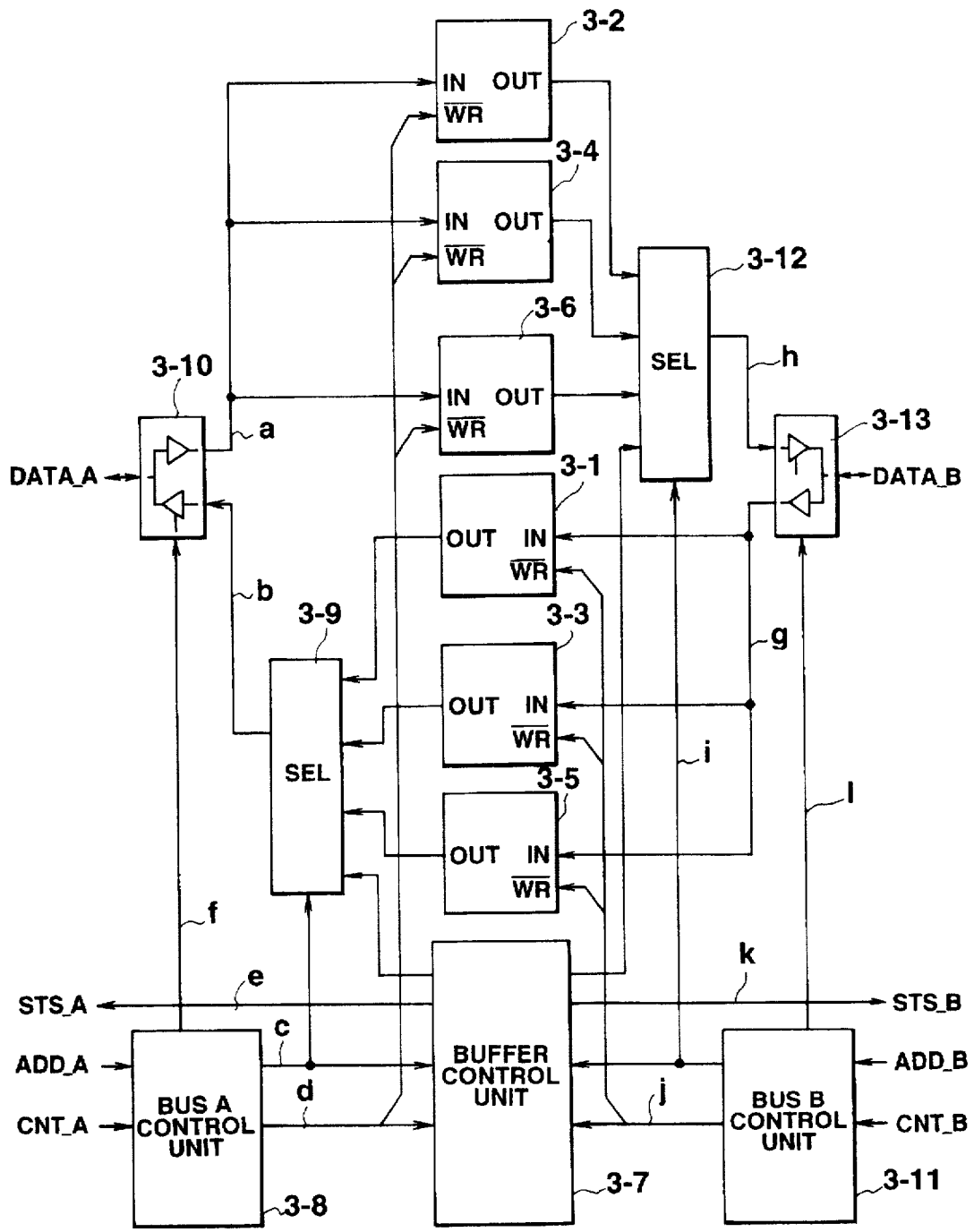
FIG. 3 is a block diagram showing a structure of an I/F unit.

FIG. 3 is a block diagram of the I/F unit 1-2 (FIG. 1).

In FIG. 3, numeral 3-1 denotes a register for storing a command, numeral 3-2 denotes a register for responding to a command, numeral 3-3 denotes a register for display data, numeral 3-4 denotes a register for key data, numeral 3-5 denotes a register for image data sent from the data converting unit 1-3 to the facsimile control unit 1-1, numeral 3-6 denotes a register for image data sent from the facsimile control unit 1-1 to the data converting unit 1-3, numeral 3-7 denotes a buffer control unit, numeral 3-8 denotes a bus A control unit, numeral 3-9 denotes a selector, numeral 3-10 denotes a two-way buffer, numeral 3-11 denotes a bus B control unit, numeral. 3-12 denotes a selector, and numeral 3-13 denotes a two-way buffer.

Each of registers 3-1 through 3-6 is structured with plural bits of D-F/Fs (D-Flip Flop). The register 3-1 sends command data from the data converting unit 1-3 to the facsimile control unit 1-1. The register 3-2 sends response data (corresponding to the command) from the facsimile control unit 1-1 to the data converting unit 1-3. The register 3-3 sends display data for the operation unit 2-8 from the data converting unit 1-3 to the facsimile control unit 1-1. The register 3-4 sends key input data of the operation unit 2-8 from the facsimile control unit 1-1 to the data converting unit 1-3. The register 3-5 sends image data from the data converting unit 1-3 to the facsimile control unit 1-1 (down load of image data). The register 3-6 sends image data from the facsimile control unit 1-1 to the data converting unit 1-3 (up load of image data).

The buffer control unit 3-7 outputs a ready signal to inform a receiving side that it is able to read data whenever a transmitting side writes data into one of the registers 3-1 through 3-6. Further, the buffer control unit 3-7 outputs an empty signal to inform the transmitting side that it is able to write new data whenever the receiving side reads written data from one of the registers 3-1 through 3-6.

The bus A control unit 3-8 inputs a read signal, a write signal and a predetermined address signal from the facsimile control unit 1-1, and generates signals c, d and f to select a buffer to be accessed in accordance with those input signals.

The selector 3-9 selects either command data from the register 3-1, display data from the register 3-3, image data from the register 3-5 and status data of each of the buffers from the buffer control unit 3-7 etc. in accordance with an address input ADD-A sent from the facsimile control unit 1-1 via the bus-A control unit 3-8.

The two-way buffer 3-10 is connected to a data bus of the facsimile control unit 1-1.

The bus B control unit 3-11 is connected to the data converting unit 1-3, (FIG. 1), and operates as the bus A control unit 3-8.

The selector 3-12 selects either response data from the register 3-2, key data from the register 3-4, image data from the register 3-6 and status data of each of the buffers from the register 3-7 etc. in accordance with an address input ADD-B sent from the data converting unit 1-3 via the bus B control unit 3-11.

The two-way buffer 3-13 is connected to a data bus of the data converting unit 1.-3.

A signal a is input data from the data bus of the facsimile control unit 1-1. A signal b is output data to the data bus of the facsimile control unit 1-1. A signal c is a select signal to control the selector 3-9, which is generated on the basis of the address input ADD-A and a bus control signal CNT-A. When the signal c is generated, the empty signal is output from the buffer control unit 3-7 to the facsimile control unit 1-1.

A signal d is a write signal to select one of buffers 3-2, 3-4 and 3-6 for a writing operation. When the signal d is generated, the ready signal is output from the buffer control unit 3-7 to the data converting unit 1-3.

A signal e is status data (e.g. ready signals and empty signals of each registers) to be sent to the facsimile control unit 1-1.

A signal f is a control signal to control an output buffer of the two-way buffer 3-10.

A signal g is input data from the data bus of the data converting unit 1-3. A signal h is output data to the data bus of the data converting unit 1-3. A signal i is a select signal to control the selector 3-12, which is generated on the basis of the address input ADD-B and a bus control signal CNT-B. When the signal i is generated, the empty signal is output from the buffer control unit 3-7 to the data converting unit 1-3.

A signal j is a write signal to select one of those registers 3-1, 3-3 and 3-5 for a writing operation.

When the signal j is generated, the ready signal is output from the buffer control unit 3-7 to the data converting unit 1-3.

A signal k is status data (e.g. ready signals and empty signals of each registers) to the data converting unit 1-3.

A signal 1 is a control signal to control an output buffer of the two-way buffer 3-13.

Figure 4:
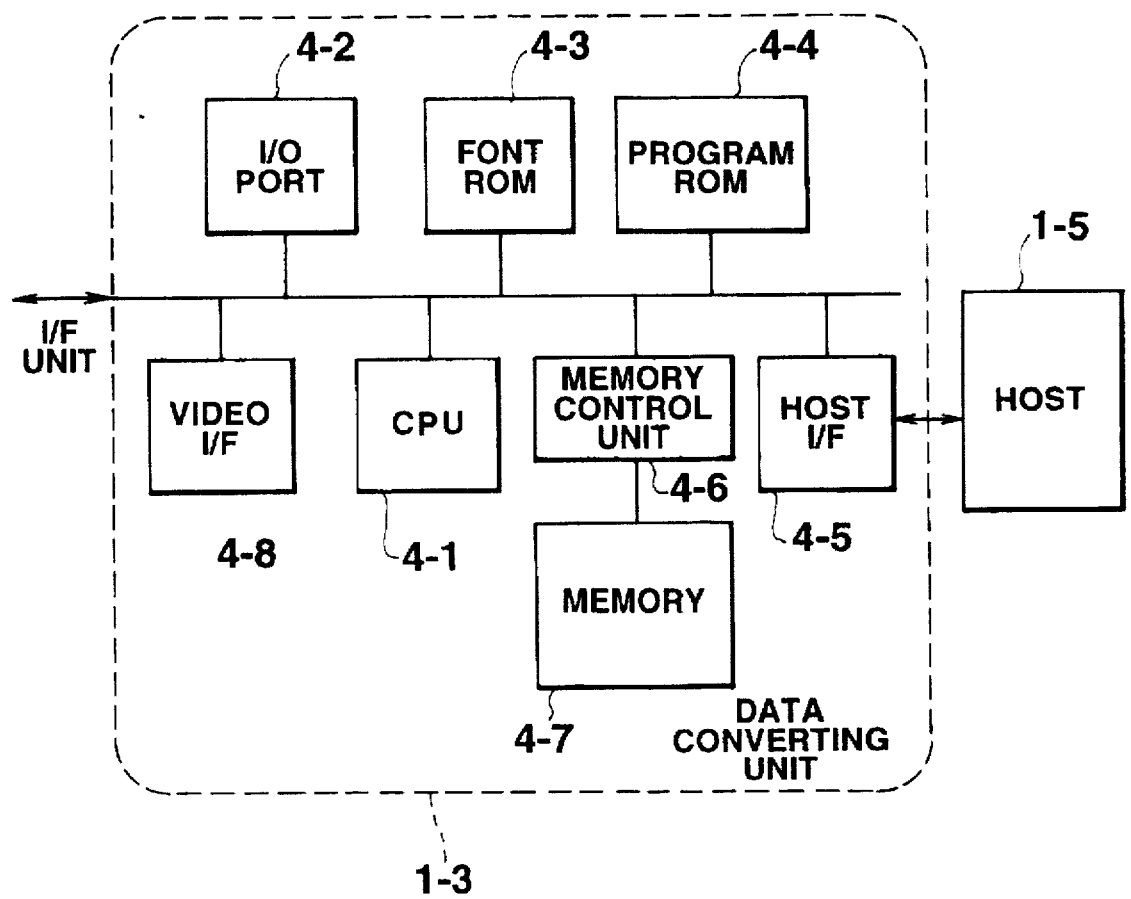
FIG. 4 is a block diagram showing a structure of a data converting unit.

FIG. 4 is a block diagram of the data converting unit 1-3 (FIG. 1). The data converting unit 1-3 converts file data received from the host 1-5 (data processing terminal) into image data (bit map image).

In FIG. 4, numeral 4-1 denotes a CPU to control an operation of the data converting unit 1-3. The CPU 4-1 performs an operation of converting file data into image data. Numeral 4-2 denotes an I/O port. Numeral 4-3 denotes a ROM for storing font data of character data. Numeral 4-4 denotes a ROM for storing an operation program of the CPU 4-1. Numeral 4-5 denotes an I/F control unit (e.g. RS232C) to connect the data converting unit 1-3 to the host 1-5. Numeral 4-7 denotes a memory (e.g. DRAM, SRAM). Numeral 4-6 denotes a memory control unit to control accessing of the memory 4-7. Numeral 4-8 denotes a video I/F unit to communicate control data with the printing unit 1-4 (FIG. 1), to read image data stored in the memory 4-7, and to control a serial transfer of the read image data.

Figure 5:
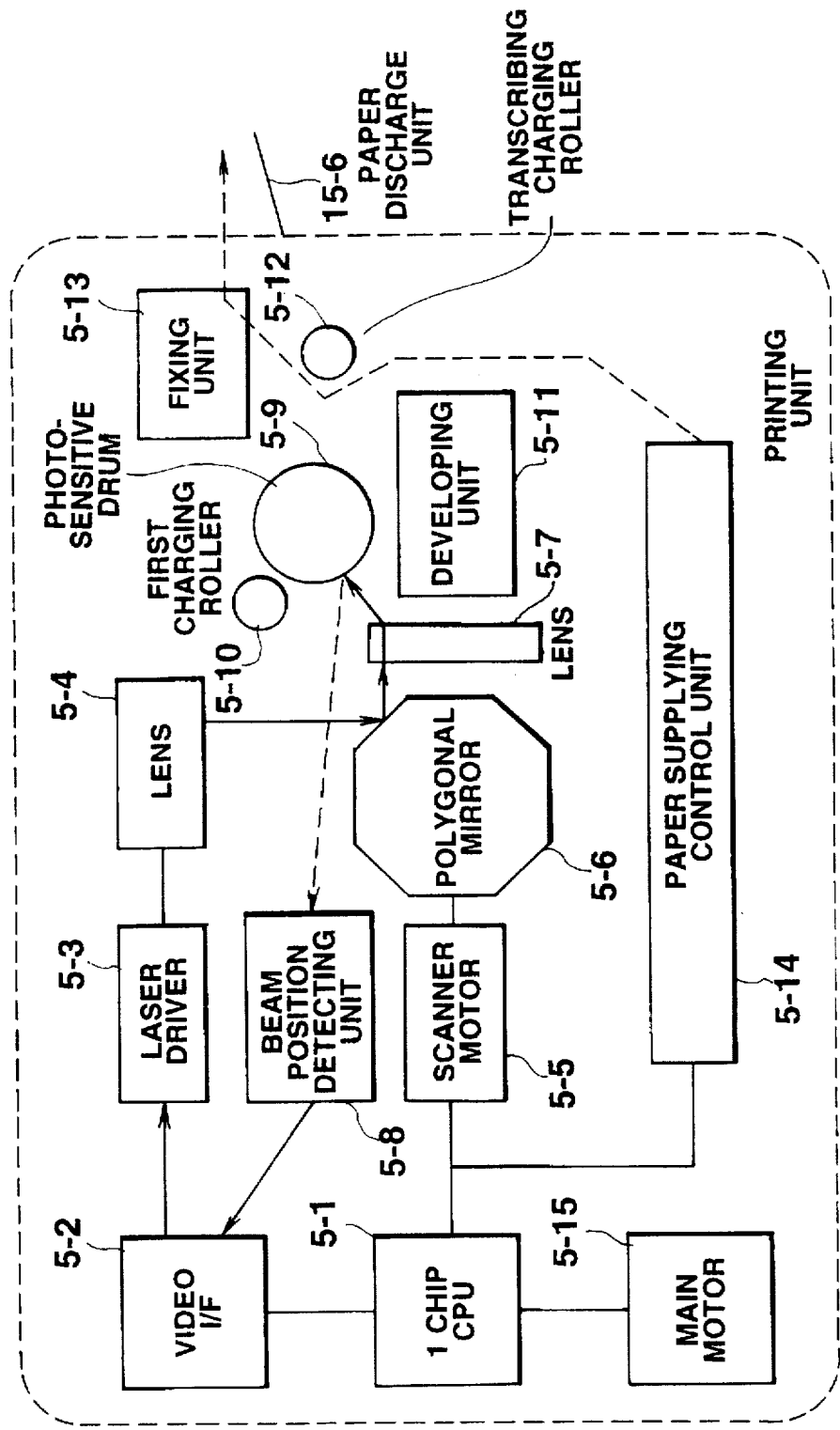
FIG. 5 is a block diagram showing a structure of a printing unit.

FIG. 5 is a block diagram of the printing unit 1-4. The printing unit 1-4 prints image data on a printing paper.

In FIG. 5, numeral 5-2 denotes a video I/F to communicate control data with the data converting unit 1-3 and to receive image data transferred thereto serially. Numeral 5-1 denotes a CPU (e.g. a one-chip microcomputer that includes ROM, RAM and I/O etc.) to control a printing operation in accordance with control data from the CPU 4-1 of the data converting unit 1-3.

Numeral 5-3 denotes a laser driver unit to control a LED and to generate a laser beam in accordance with a driving signal sent by the video I/F 5-2.

A laser beam from the laser driver unit 5-3 is converted into a parallel beam by a lens 5-4, and is supplied to a polygonal mirror 5-6 which is being rotated at a fixed speed by a scanner motor 5-6. The laser beam reflected by the polygonal mirror 5-6 is irradiated onto a photo-sensitive drum 5-9 via a lens 5-7. When the polygonal mirror 5-6 is rotated at the fixed speed, the laser beam scans the photo-sensitive drum 5-9 at a fixed speed. A beam position detecting unit 5-8 detects each scanning line of the laser beam, and generates a line synchronizing signal.

A printing operation will be described as follows.

The photo-sensitive drum 5-9, which is being rotated, is charged by a first charging roller 5-10, and is scanned by a laser beam. Thereby, an electric image is made on the photo-sensitive drum 5-9. The electric image on the drum 5-9 is developed by a developing unit 5-11 so as to make a toner image on the drum 5-9. A transcribing charging roller 5-12 charges a printing paper which is transferred by a paper supplying control unit 5-14, and the toner image on the drum 5-9 is transcribed to the charged printing paper. The toner image transcribed on the printing paper is fixed by a fixing unit 5-13.

The photo-sensitive drum 5-9, the first charging roller 5-10, the transcribing charging roller 5-12, and the paper supplying control unit 5-14 are driven by a main motor 5-15.

The apparatus according to this embodiment functions as a printer and functions as a facsimile apparatus.

In this embodiment, the operation as a printer will be described by using FIG. 1 as follows.

File data is sent from the host 1-5 to the data converting unit 1-3, and is converted to image data (bit map image) by the data converting unit 1-3.

The image data is sent from the data converting unit 1-3 to the printing unit 1-4. The printing unit 1-4 prints image data received from the data converting unit 1-3 on printing paper.

Next, data communication between the host 1-5 and the data converting unit 1-3, and data communication between the data converting unit 1-3 and the printing unit 1-4 will be described on the basis of FIG. 6 and FIG. 7 as follows.

Figure 6:
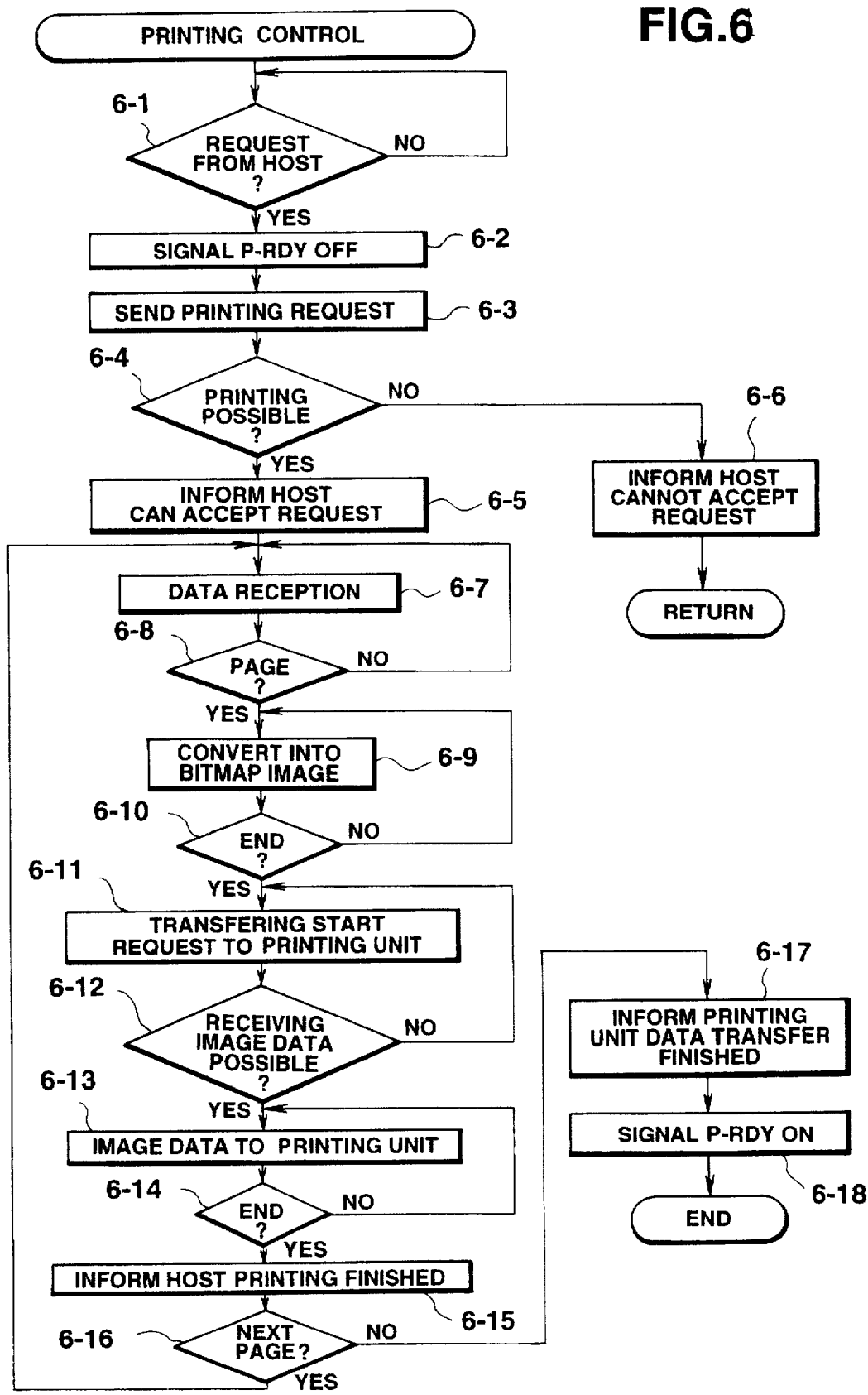
FIG. 6 is a flow chart showing a control operation of the data converting unit in a printer mode.

FIG. 6 is a flow chart showing a control operation of the CPU 4-1 of the data converting unit 1-3 when the apparatus is operated as a printer.

In a case where a data transferring request (i.e. a printing request) is sent from the host 1-5 to the data converting unit 1-3 (6-1), the CPU 4-1 sets a signal P-RDY to be off (6-2), and sends a printing request to the printing unit 1-4 (6-3). The signal P-RDY is sent to the facsimile control unit 1-1.

The CPU 4-1 checks whether the printing unit 1-4 is capable of printing or not, on the basis of a response from the printing unit 1-4 (6-4). If the printing unit 1-4 is capable of printing, the CPU 4-1 informs the host 1-5 it is able to accept the data transferring request (6-5). If the printing unit is not capable of printing, the CPU 4-1 informs the host 1-5 it is unable to accept the data transferring request (6-6), and finishes the data communication.

In a case where the host 1-d5 receives the information that accepting the data transferring request is possible, the CPU 4-1 performs a data transferring operation between the host 1-5 and the data converting unit 1-3 until a page of data is received (6-7, 6-8). When a page of data is received, the CPU 4-1 performs a process to convert received data into image data until the converting process for the page of data is finished (6-9, 6-10). When conversion of the page of data is finished, the CPU 4-1 sends a data transferring request of the image data to the printing unit 1-4 (6-11). The CPU 4-1 checks whether the data transferring request is acceptable in the printing unit 1-4 or not (6-12), and sends a data transferring request to the printing unit 1-4 until the data transferring request is accepted by the printing unit 1-4. When the data transferring request is accepted, the CPU 4-1 sends the image data as serial data to the printing unit 4-1 in accordance with a line synchronizing signal from the printing unit 1-4 until the data sending is finished (6-13, 6-14). When the data sending is finished, the CPU 4-1 informs the host 1-5 that it has finished printing the page of data (6-15), and checks whether a data transferring request of a next page of data is sent from the host 1-5 or not (6-16). If the data transferring request of the next page is sent, the CPU 4-1 shifts to step 6-7 so as to receive the next page of data. If the data transferring request is not sent in step 6-16, the CPU 4-1 informs the printing unit 1-4 of finishing sending image data (6-17), sets the signal P-RDY to be on, (6-18), and finishes the data converting operation and data sending operation.

Figure 7:
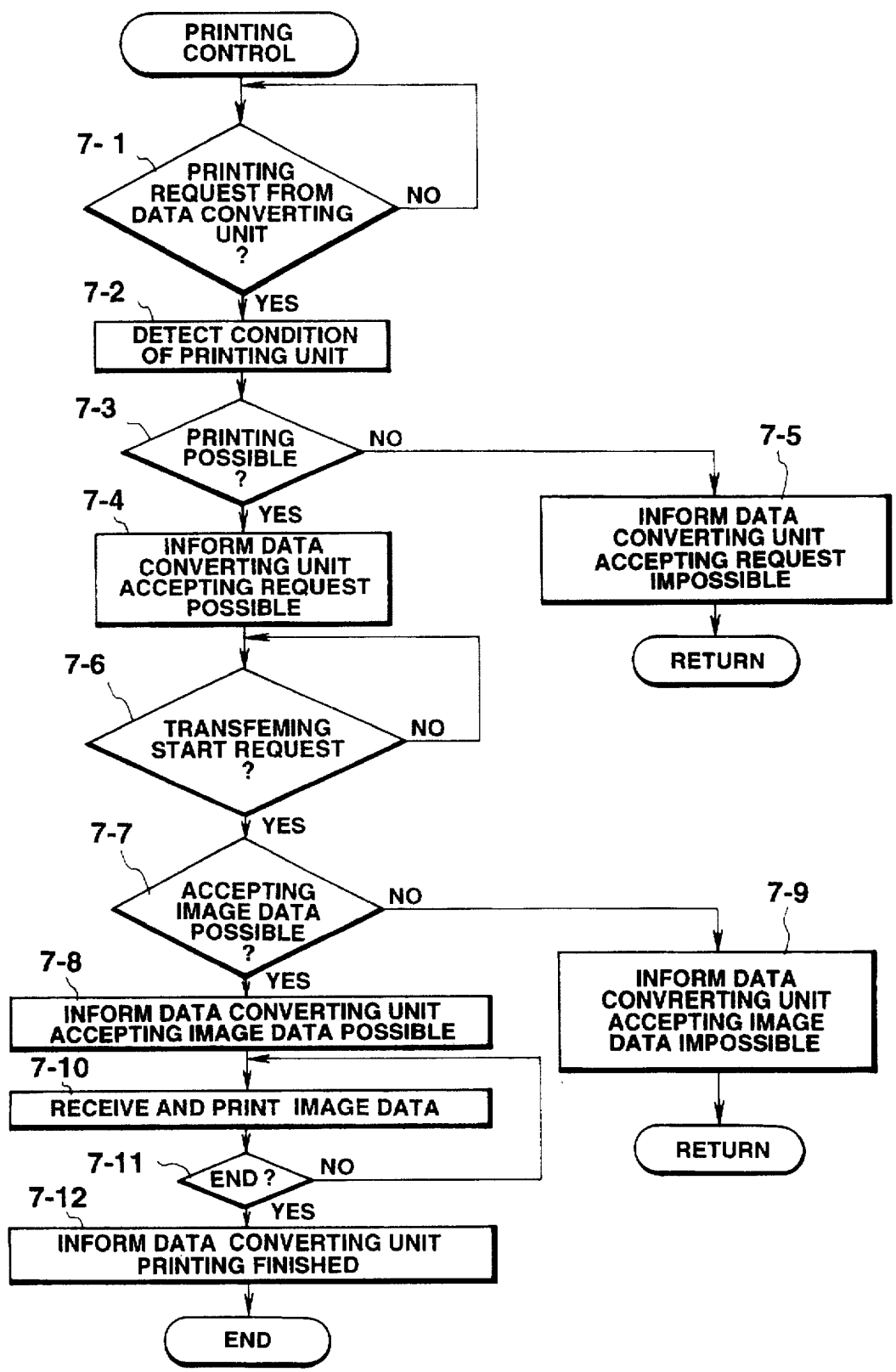
FIG. 7 is a flow chart showing a control operation of the printing unit in the printer mode.

FIG. 7 is a flow chart showing a control operation of the CPU 5-1 of the printing unit 1-4 when the apparatus prints data from the host 1-5.

In a case where a printing request is sent from the data converting unit 1-3 (7-1), the CPU 5-1 checks an internal condition of the printing unit 1-4 (7-2). For example, the CPU 5-1 detects a temperature of the fixing unit 5-13, and checks whether the temperature is in a predetermined range. The CPU 5-1 discriminates whether or not it is able to print data, on the basis of the result of checking the internal condition (7-3). If the CPU 5-1 discriminates that it is not able to print data, the CPU 5-1 informs the data converting unit 1-3 that it is unable to accept the printing request (7-5). If the CPU 5-1 discriminates it is able to print data, the CPU 5-1 informs the data converting unit 1-3 it is able to accept the printing request (7-4), and waits to receive a start request of image data sending from the data converting unit 1-3 (7-6). When the start request is sent from the data converting unit 1-3, the CPU 5-1 checks whether image data from the data converting unit 1-3 is able to be accepted or not (7-7). If the image data is not able to be accepted, the CPU 5-1 informs the data converting unit 1-3 that it is unable to accept the image data (7-9). If the image data is able to be accepted, the CPU 5-1 drives the scanner motor 5-6 and the main motor 5-15 so as to prepare a printing operation, and informs the data converting unit 1-3 that it is able to accept the image data (7-8). When the image data (serial data) is received from the data converting unit 1-3, the CPU 5-1 starts a printing operation, and performs the printing operation until finishing printing a page of image data (7-10, 7-11). When the page of image data is finished, the CPU 5-1 stops the scanner motor 5-6 and the main motor 5-15 so as to finish the printing operation, and informs the data converting unit 1-3 of finishing the printing operation (7-12).

Next, a facsimile receiving operation will be described in accordance with FIG. 8 and FIG. 9 as follows.

A receiving operation is performed by a receiving control of image data and a recording control of received image data. The receiving control is performed by the facsimile control unit 1-1, and the facsimile control unit 1-1 stores received image data into the storage memory 2-11. In the recording control, the facsimile control unit 1-1 sends received image data to the data converting unit 1-3 in sequence, and the data converting unit 1-3 controls the printing unit 1-4 so as to perform a recording operation. In the apparatus according to this embodiment, each of the receiving control and the recording control are independently performed by using the storage memory 2-11.

Figure 8:
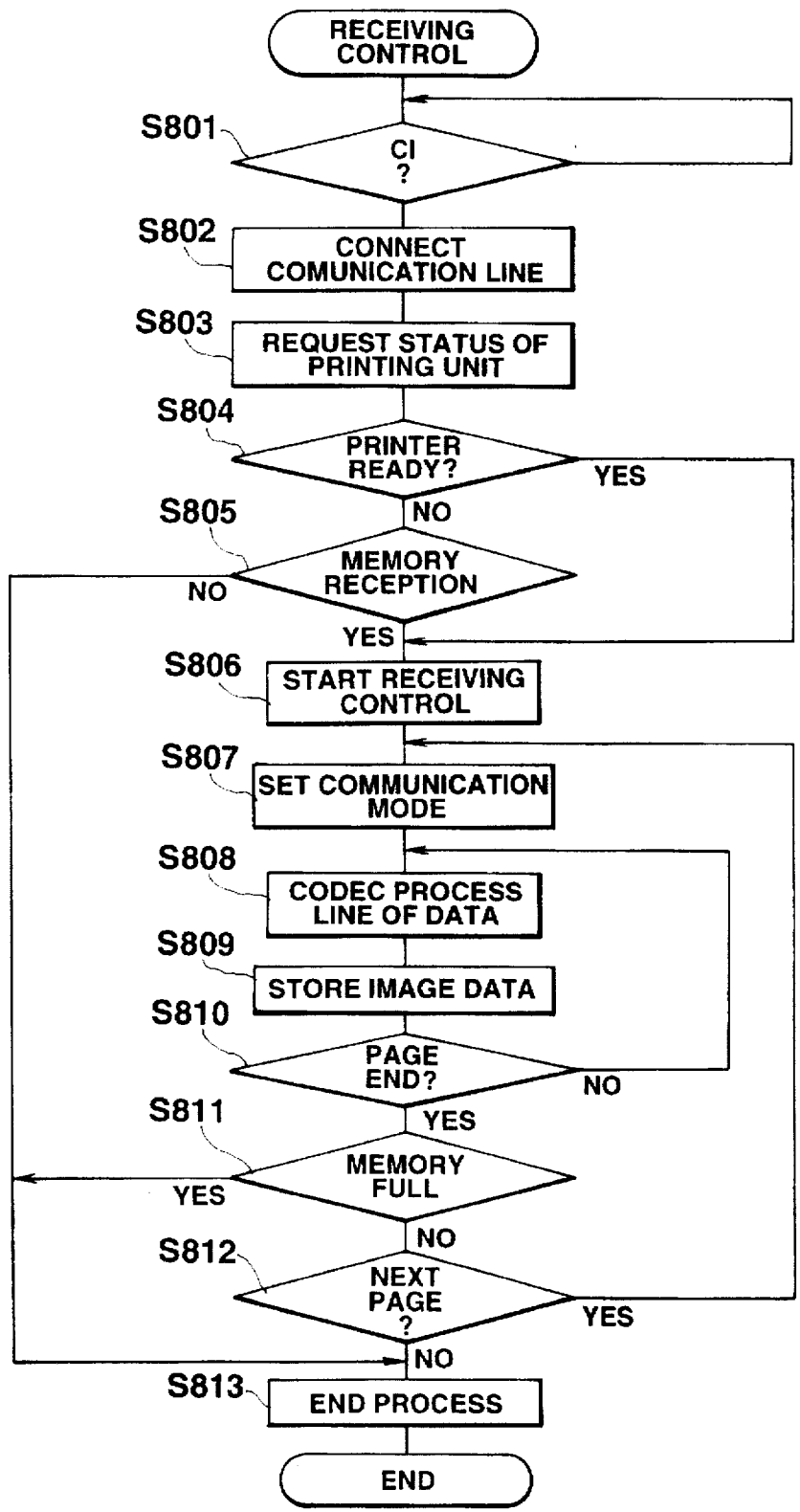
FIG. 8 is a flow chart showing a receiving control.

FIG. 8 is a flow chart showing a receiving control operation of the CPU 2-1 when the apparatus performs the receiving operation.

The CPU 2-1 checks whether a CI (a calling signal) is detected by the NCU 2-5 or not (S801). In a case where a CI is detected, the CPU 2-1 causes the NCU 2-5 to hold the communication line, and sets a signal F-RDY of the I/O port 2-10 in the facsimile control unit 1-1, which indicates that the facsimile control unit 1-1 is in use, to be "0" (S802). The CPU 2-1 requests a status of the printing unit 1-4 to the data converting unit 1-3, and receives the status of the printing unit 1-4 via the I/F unit 1-2 (S803). The CPU 2-1 checks whether the printing unit 1-4 is able to print received image data or not, in accordance with the received status information which includes a use condition, error condition etc. in the printing unit 1-4 (S804). In this embodiment, the use condition is discriminated on the basis of the signal R-RDY connected between the data converting unit 1-3 and the I/O port 2-10 of the facsimile control unit 1-1, and status information which includes the condition of the printing unit 1-4 and the condition of the data converting unit 1-3.

If the printing unit 1-4 is not able to print received image data because the printing unit 1-4 is in use, or in an error condition (e.g. no recording paper), the CPU 2-1 discriminates whether memory reception is possible or not, on the basis of an amount of available area in the storage memory 2-11 (S805). If the amount is less than a predetermined value, the CPU 2-1 performs a process to finish the receiving operation (S813). If memory reception or printing of the received image data is possible, the CPU 2-1 starts a receiving control (S806). After starting the receiving control, the CPU 2-1 sets a communication mode (e.g. an image size, pixel density, line density, a communication speed, a coding method etc.) (S807).

In the receiving control, image data from the communication line is received by the modem 2-4 through the NCU 2-5. The image data received by the modem 2-4 is data coded by a coding method set in step S807. The CPU 2-1 causes the decoding unit 2-13b of the codec 2-13 to decode the received image data in line units, and decoded line data is temporarily stored in the internal line buffer 2-13c of the codec 2-13. The CPU 2-1 causes the coding unit 2-13a of the codec 2-13 to code line data stored in the internal line buffer 2-13C by a predetermined coding method (S808). Further, the CPU 2-1 sequentially stores the line data coded by the coding unit 2-13a into the storage memory 2-11 (S809).

Next, the CPU 2-1 discriminates whether a page of image data has been received or not (S810). If a page of image data has not been received, the CPU 2-1 shifts to step S808 so as to continue receiving the page of image data. If a page of image data has been received, the CPU 2-1 checks an amount of available area in the storage memory 2-11 (S811). In a case where the amount is less than the predetermined valued, the CPU 2-1 performs the process to finish the receiving control (S813). On the other hand, in a case where the amount is not less than the predetermined valued, the CPU 2-1 discriminates whether a next page of image data is received or not (S812). If a next page is received, the CPU 2-1 shifts to step S807. If a next page is not received, the CPU 2-1 shifts to step S813. When the receiving control is finished in step S813, the CPU 2-1 sets the signal F-RDY of the I/O port 2-10, which indicates that the facsimile control unit 1-1 is in standby condition, to be "1".

Figure 9:
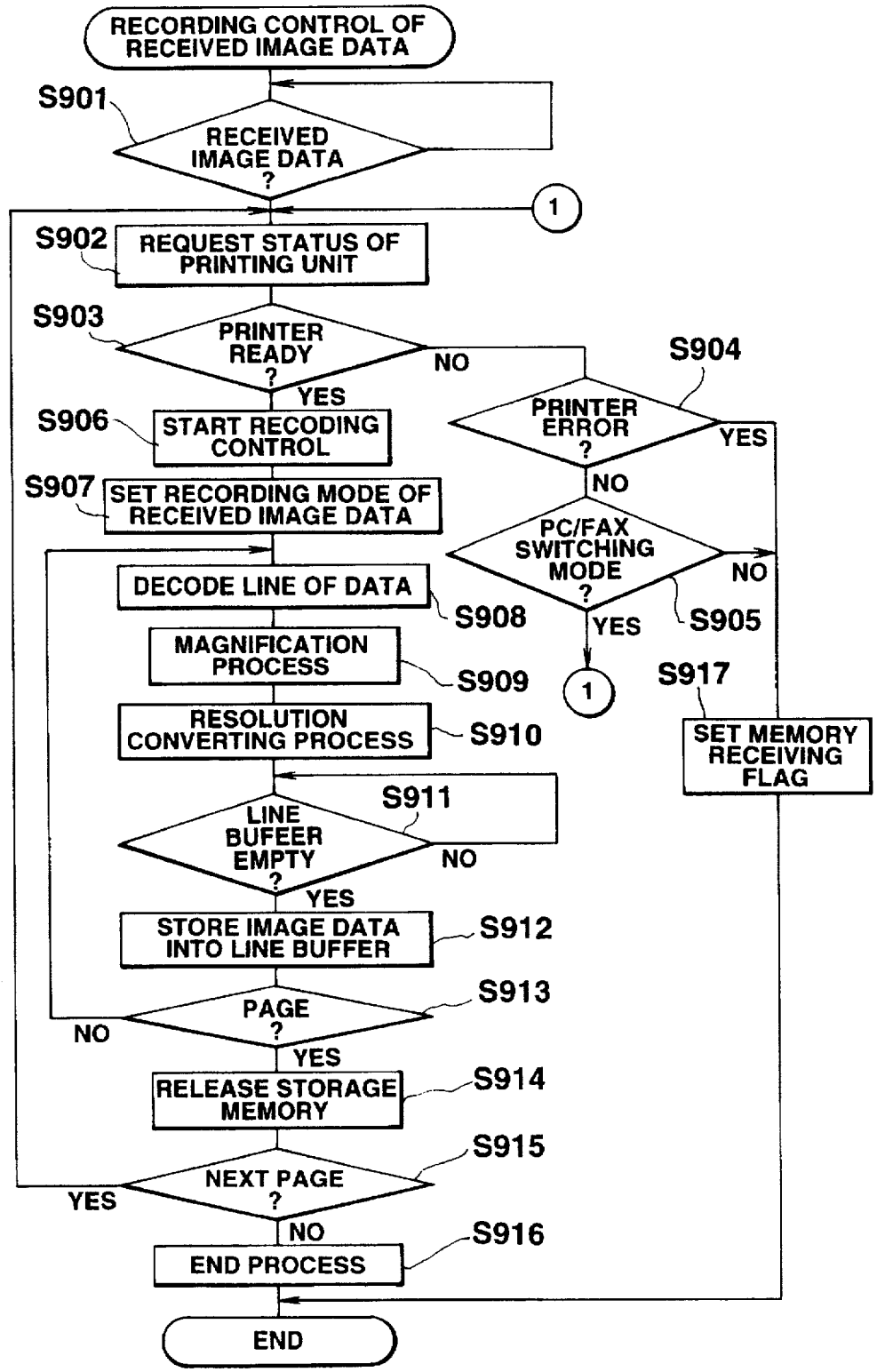
FIG. 9 is a flow chart showing a recording control of received image data.

FIG. 9 is a flow chart showing a recording control of received image data by the CPU 2-1. The CPU 2-1 checks whether received image data to be printed has been stored in the storage memory 2-11 or not (S901). If received image data to be printed has been stored, the CPU 2-1 requests status information of the printing unit 1-4 to the data converting unit 1-3 so as to check the condition of the printing unit 1-4 (S902). The CPU 2-1 receives status information of the printing unit 1-4 via the I/F unit 1-2. The status information includes information of the use condition, error condition etc. The CPU 2-1 discriminates whether the printing unit 1-4 is able to print the received image data, on the basis of the status information and the setting of a PC/FAX switching function (S903). The PC/FAX switching function is to control switching between a printer mode (record data from the host 1-5) and a facsimile mode (record image data from the facsimile control unit 1-1) in accordance with the predetermined mode set in the apparatus.

Figure 10:
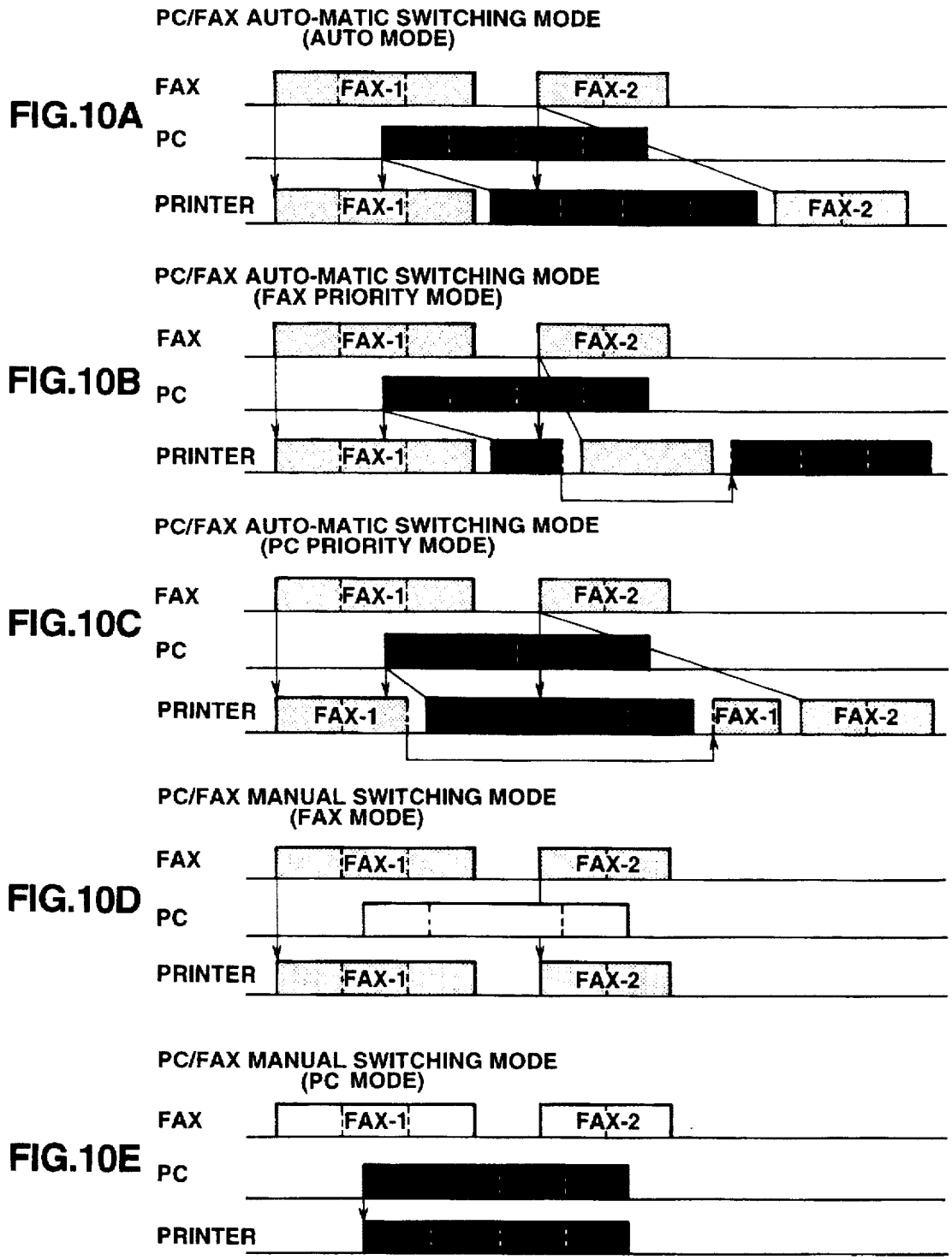
FIGS. 10A-10E are views showing operations in each mode of a PC/FAX switching process.

The PC/FAX switching function according to this embodiment has a PC/FAX automatic switching mode (AUTO mode/PC priority mode/FAX priority mode) and a PC/FAX manual switching mode (PC mode/FAX mode). An operator selects between those modes. Operations of each mode will be described in accordance with FIG. 10 as follows.

1. PC/FAX automatic switching mode (AUTO mode)

In a case where a recording request from the facsimile control unit 1-1 or the host 1-5 is generated, and where the printing unit 1-4 is in the standby condition, the apparatus starts a printing control. If the printing request is generated while the printing unit 1-4 is being operated, the apparatus automatically switches between the facsimile mode and the printer mode and performs the printing control after finishing the previous printing control (FIG. 10(a)).

2. PC/FAX automatic switching mode (FAX priority mode)

In a case where a printing request from the facsimile control unit 1-1 is generated while the printing unit 1-4 is being operated in the printer mode, the apparatus temporarily suspends the printing operation between a previous page and a next page in the printer mode, automatically shifts to the facsimile mode, and performs a printing control of the facsimile mode. After finishing the printing control of the facsimile mode, the apparatus automatically shifts to the printer mode, and restarts the suspended printing control of the printer mode. On the other hand, in a case where a printing request from the host 1-5 is generated while the printing unit 1-4 is being operated in the facsimile mode, the apparatus automatically shifts to the printer mode, and performs the printing control of the printer mode after finishing the printing control of the facsimile mode (FIG. 10(b)).

3. PC/FAX automatic switching mode (PC priority mode)

In a case where a printing request from the host 1-5 is generated while the printing unit 1-4 is being operated in the facsimile mode, the apparatus temporarily suspends the printing operation between a previous page and a next page in the facsimile mode, automatically shifts to the printer mode, and performs a printing control of the printer mode. After finishing the printing control of the printer mode, the apparatus automatically shifts to the facsimile mode, and restarts the suspended printing operation of the facsimile mode. On the other hand, in a case where a printing request from the facsimile control unit 1-1 is generated while the printing unit 1-4 is being operated in the printer mode, the apparatus automatically shifts to the facsimile mode and performs a printing control of the facsimile mode after finishing the printing control of the printer mode (FIG. 10(c)).

4. PC/FAX manual switching mode (FAX mode).

In a case where a printing request from the facsimile control unit 1-1 is generated, the apparatus performs a printing control of the facsimile mode. On the other hand, in a case where a printing request from the host 1-5 is generated, the apparatus informs the host 1-5 that the printing unit 1-4 is unable to print data in the printer mode (FIG. 10(d)).

5. PC/FAX manual switching mode (PC Mode)

In a case where a printing request from the host 1-5 is generated, the apparatus performs a printing control of the printer mode. On the other hand, in a case where a printing request from the facsimile control unit 1-1 is generated, the apparatus informs the facsimile control unit 1-1 that the printing unit 1-4 is unable to print data in the facsimile mode, and performs memory reception. (FIG. (e)).

In the following explanation, the PC/FAX automatic switching mode (AUTO mode) has been selected.

In a case where the printing unit 1-4 is not able to print data in step S903, the CPU 2-1 checks for an error condition of the printing unit 1-4 (S904). If the printing unit 1-4 is in an error condition (e.g. no paper, or paper jam etc.), the CPU 2-1 sets a flag SR (Substitute Reception=memory reception) which indicates that memory reception is being performed (S917), and finishes the process of printing received image data. If the printing unit 1-4 is not in an error condition, the CPU 2-1 determines that the printing unit 1-4 is being operated in the printer mode, checks what mode has been set in the PC/FAX switching control, and discriminates whether the mode set in the PC/FAX switching control is to print image data received in facsimile reception or not (S905). If the mode is the PC mode in the PC/FAX manual switching mode, the CPU 2-1 shifts to step S917. If the set mode is to print the received image data, the CPU 2-1 shifts to step S902 so as to wait for the printing unit 1-4 to be the facsimile mode.

In a case where the printing unit 1-4 is able to print data in step S903, the CPU 2-1 starts a printing control of image data received in facsimile reception (S906). The CPU 2-1 sets a recording mode of the received image data (S907). Setting a recording mode includes, for example, setting a magnification/reduction ratio of the received image data and pixel density modification of the received image data in accordance with a size and pixel density of the received image data, paper size and recording pixel density in the printing unit The CPU 2-1 causes the decoding unit 2-13b to decode the image data stored in the storage memory 2-11 in line units (S908), and causes the resolution converting unit 2-12 to convert an image size and pixel density of the received image data on the basis of the recording mode set in step S907 (S909, S910). The CPU 2-1 checks whether the line buffer 2-9 is empty or not (S911). When the line buffer 2-9 is empty, the CPU 2-1 stores a line of received image data into the line buffer 2-9 (S912). The image data stored in the line buffer 2-9 is read out by the data converting unit 1-3 through the I/F unit 1-2.

The CPU 2-1 checks whether a page of received image data has been transferred to the line buffer 2-9 or not (S913). If a page of received image data has not been transferred yet, the CPU 2-1 shifts to step S908. If a page of received image data has been transferred, the CPU 2-1 releases a memory area of the storage memory 2D11 corresponding to the page read out from the storage memory 2-11 (S914), and checks whether a next page of received image data is stored in the storage memory 2-11 or not (S915). If a next page is stored, the CPU 2-1 shifts to step S902. If a next page is not stored, the CPU 2-1 performs an end process to finish the recording control of received image data (S916).

Next, facsimile transmission of data from the host 1-5 will be described as follows. The facsimile transmission is controlled by the host 1-5.

Figure 11:
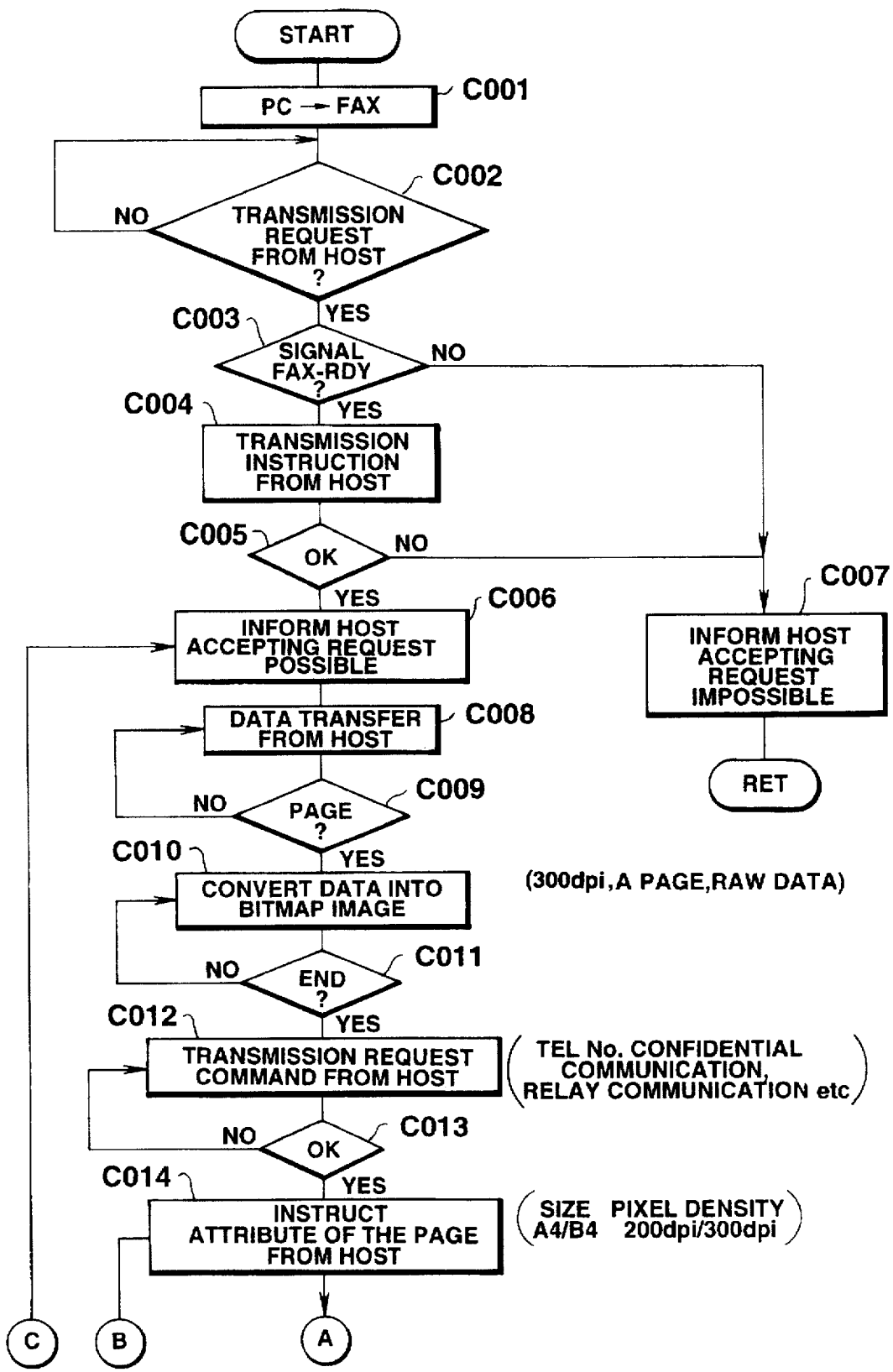
FIG. 11 and FIG. 12 together form a flow chart showing a control operation of the data converting unit when the apparatus sends data from a host to a destination by facsimile transmission.
Figure 12:
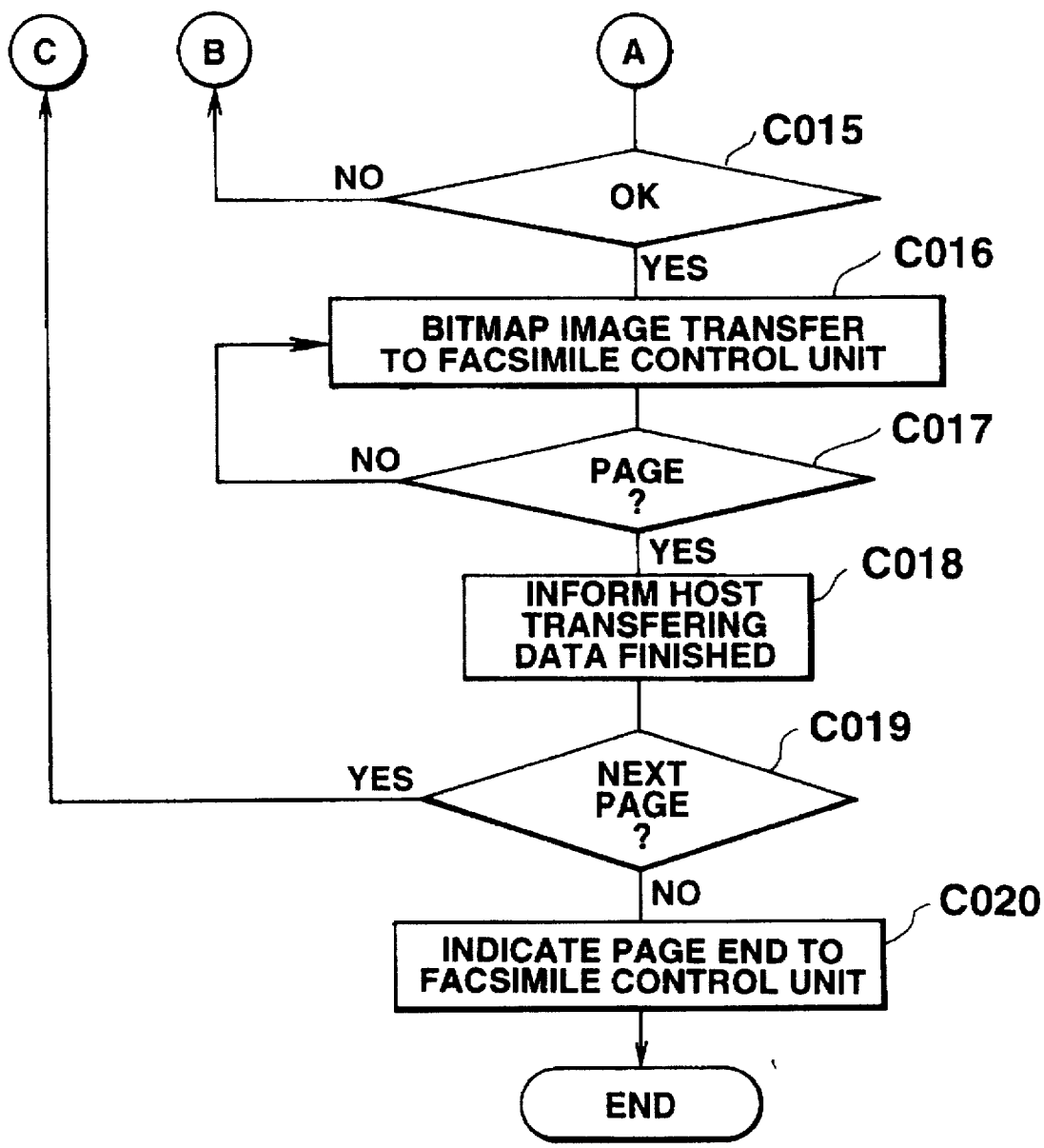

FIGS. 11 and 12 together form a flow chart showing a control operation of the CPU 4-1 in the data converting unit 1-3.

The data converting unit 1-3 communicates commands with the host 1-5 on the basis of PDL (Page Description Language). When the data converting unit 1-3 sends commands from the host 1-5 to the facsimile control unit 1-1, the data converting unit 1-3 converts commands from the host 1-5 into commands which are suitable to the facsimile control unit 1-1.

When the host 1-5 sends file data, which includes data (or image data) and information of telephone numbers of a destination, to the data converting unit 1-3, the host 1-5 sends a transmission request command according to PDL to the data converting unit 1-3.

The CPU 4-1 receives a command from the host 1-5 (C0001), and checks whether the received command is a transmission request command or not (C002). If Post Script (PS) is used as PDL, a bit map image stored in the memory 4-7 might be sent to the facsimile control until 1-1.

If the received command is a transmission request command, the CPU 4-1 checks whether the facsimile control unit is able to perform facsimile transmission or not, on the basis of a status FAX-RDY from the facsimile control unit 1-1 (C003). If the facsimile control unit 1-1 is not able to perform facsimile transmission (status NOT-RDY), the CPU 4-1 informs the host 1-5 that the facsimile control unit 1-1 is not available (C007). If the facsimile control unit 1-1 is able to perform facsimile transmission (status FAX-RDY), the CPU 4-1 sends a transmission request to the facsimile control unit 1-1 (C004), and checks a response from the facsimile control unit 1-1 (C005). If the response is OK, the CPU 4-1 informs the host 1-5 that facsimile transmission is possible (C006). The CPU 4-1 receives information data (e.g. telephone number, destination name, confidential communication, broadcast transmission, and relay transmission etc.) and image data (PDL data) from the host 1-5 until a page of data is received (C008, C009). In the receiving operation in step C008, each factor of the information data are separately received in accordance with the RS (Request-Send) procedure. When a page of data has been received, the CPU 4-1 converts the page of image data (PDL data) into a bit map image (raw data for facsimile, 300 dpi) (C010, C011)). If the CPU 4-1 discriminates that the converting operation is finished, the CPU 4-1 sends a transmission request command to the facsimile control unit 1-1 (C012). The transmission request command includes the information data. If the CPU 4-1 receives a response from the facsimile control unit 1-1 that is OK (C013), the CPU 4-1 sends attribute information of the page to the facsimile control unit 1-1 (C014), and checks whether a response from the facsimile control unit 1-1 is OK or not (C015 of FIG. 12). The attribute information of the page indicates a size and pixel density of the page. If a response from the facsimile control unit 1-1 is OK in step C015, the CPU 4-1 sends the bit map image (raw image, 300 dpi) stored in the memory 4-7 to the facsimile control unit 1-1 until a page of the bit map image is finished (C016, C017). Then, the facsimile control unit 1-1 receives the bit map image via the I/F unit 1-2, codes the bit map image so as to be code data in line units by the coding unit 2-13a, and stores the code data into the storage memory 2-11.

If a page is finished in step C017, the CPU 4-1 informs the host 1-5 that a page of image data has been transferred to the facsimile control unit 1-1 (C018), and checks whether a next page is sent from the host 1-5 or not (C019). If a next page is sent, the CPU 4-1 shifts to step C006. If a next page is not sent, the CPU 4-1 sends a command, which indicates that all pages have been finished, to the facsimile control unit 1-1 (C020), and finishes the process.

Figure 13:
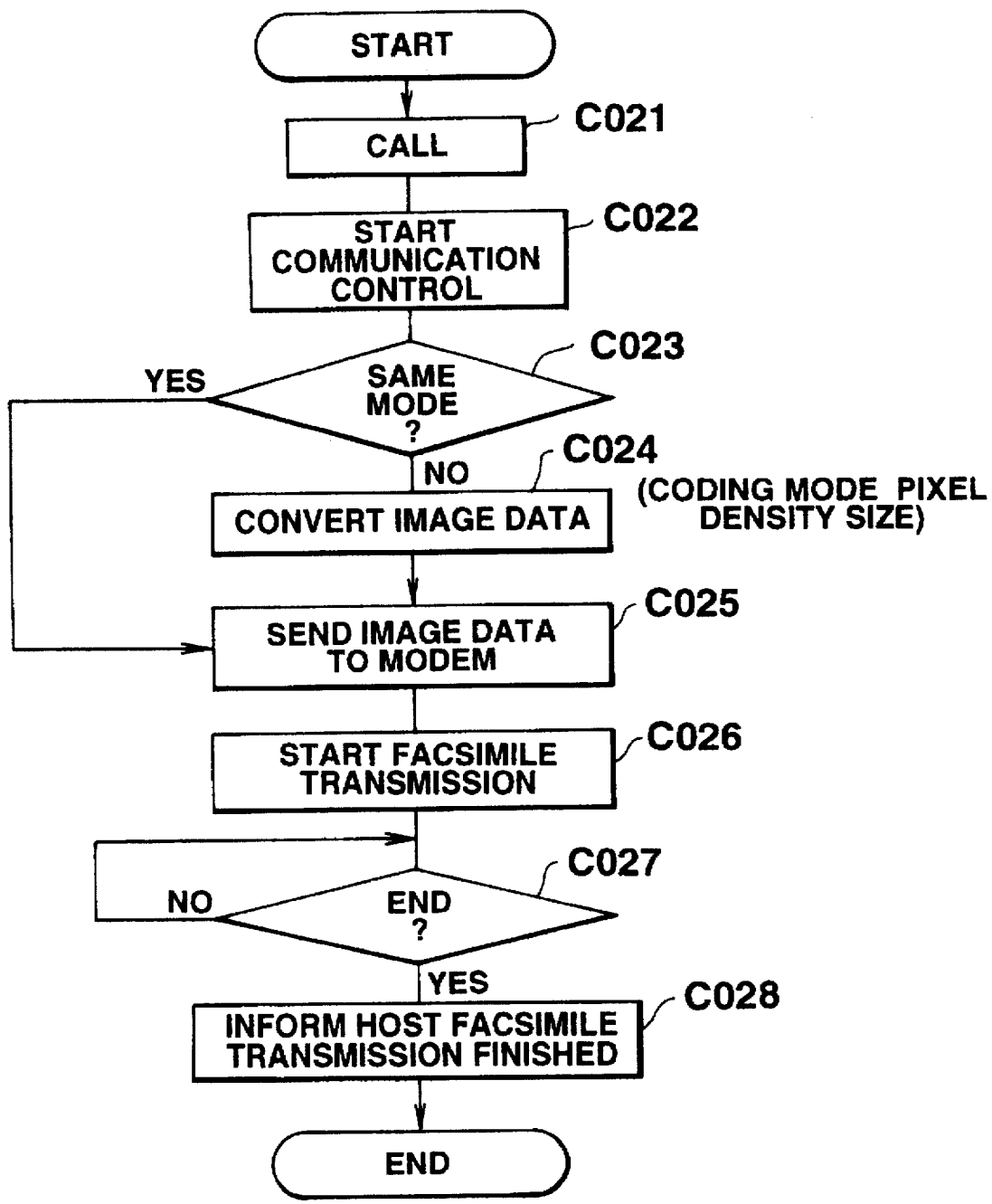
FIG. 13 is a flow chart showing a control operation of the facsimile control unit in the facsimile transmission of data from the host.

FIG. 13 is a flow chart showing a control operation of facsimile transmission by the CPU 2-1 in the facsimile control unit 1-1.

When the facsimile control unit 1-1 receives the command, which indicates that all pages have been sent, from the data converting unit 1-3, the CPU 2-1 performs a calling operation in accordance with the destination's telephone number sent from the host 1-5 through the data converting unit 1-3 (C021). The CPU 2-1 performs a transmission protocol via the modem (C022), checks the transmission mode (coding method, pixel density, size etc.) determined in the transmission protocol, and discriminates whether the image data to be sent has to be converted or not (C023). For example in a case where the destination can only process data of 200/400 dpi, and where the pixel density of the image data is 300 dpi, the CPU 2-1 causes the resolution converting unit 2-12 to convert the pixel density of the image data to be sent into 200 or 400 dpi.

The CPU 2-1 causes the resolution converting unit 2-12 and the codec unit 2-13 to perform a data converting operation by coding method, pixel density, and size etc. (C024), sends to the modem 2-4 image data in line units (C025), and starts a transmission via the modem 2-4 (C026). The CPU 2-1 discriminates whether the transmission is finished or not (C027),and when the transmission is finished, the CPU 2-1 informs the host 1-5 that the facsimile transmission is finished via the data converting unit 1-3 (C028).

Next, a copy operation will be described as follows.

Figure 14:
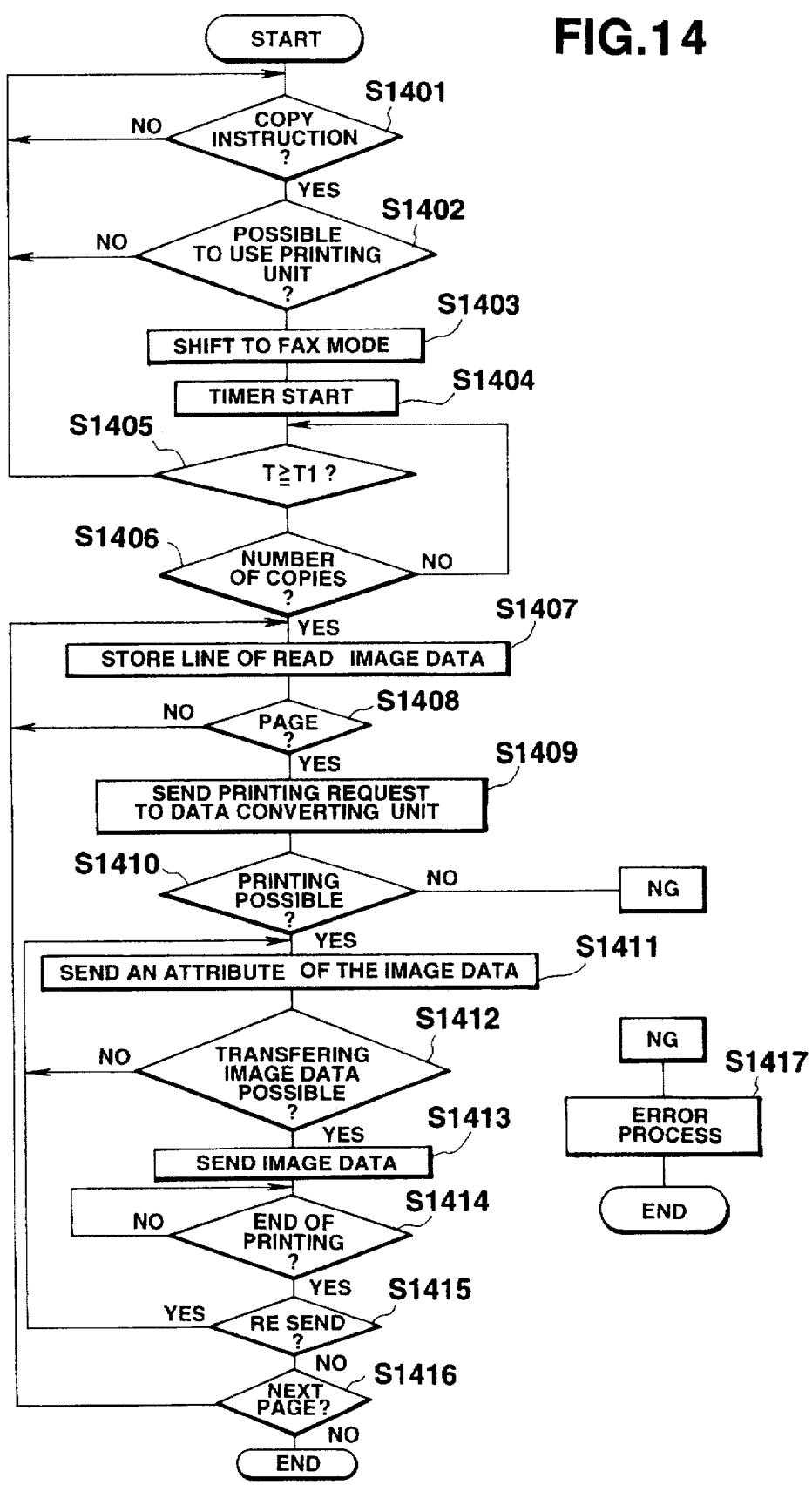
FIG. 14 is a flow chart showing a copy operation.

FIG. 14 is a flow chart showing a control operation of the CPU 2-1 of the facsimile control unit 1-1 in a copy operation.

When a copy operation is performed, an operator sets an original document in the scanner unit 2-7, and inputs a copy instruction by key operation of the operation unit 2-8. The CPU 2-1 checks whether the copy instruction is input or not (S1401), and when the copy instruction is input, the CPU 2-1 checks whether the printing unit 1-4 is able to print data or not (1402). If the printing unit 1-4 is able to print, the CPU 2-1 causes a LCD of the operation unit 2-8 to display indication information for the operator to enter a number of copies (S1403), starts a timer T1 (S1404), and checks whether information about a number of copies is entered or not before the timer T1 runs over (S1405, S1406). If information about a copy number is not entered before the time T1 runs over, the CPU 2-1 shifts to step S1401. If information about a copy number is entered, the CPU 2-1 starts a reading operation. The CPU 2-1 performs a reading process of a line of image date, causes the coded unit 2-13 to code image data processed by the image processing unit 2-6, and stores the code data into the storage memory 2-11 (S1407). The CPU 2-1 discriminates whether a page of image data has been stored in the storage memory 2-11 or not (S1408), and alternately performs the processes of step S1407 and step S1408 until a page of image data is stored in the storage memory 2-11. If a page of image data is stored, the CPU 2-1 sends a printing request to the data converting unit 1-3 (S1409), and checks whether the printing unit 1-4 is able to print data or not (S1410). If the printing unit 1-4 is able to print data, the CPU 2-1 sends information data (e.g. pixel density, size, printing number) to the data converting unit 1-3 (S1411), and checks whether sending image data is possible or not (1412). If sending image data is possible, the CPU 2-1 reads the image data from the storage memory 2-11, causes the decoding unit 2-13b to decode the read image data, stores the decoded image data into the line buffer 2-9, and sends the decoded image data through the I/F unit 1-2 to the data converting unit 1-3 (S1413). If converting the pixel density of the image data is necessary in sending the image data, the CPU 2-1 causes the resolution converting unit 2-12 to convert the pixel density of the image data stored in the line buffer 2-9, and sends the converted image data to the data converting unit 1-3. When a page of image data has been sent to the data converting unit 1-3, the CPU 2-1 informs the data converting unit 1-3 that it has finished sending a page of image data (S1413). The data converting unit 1-3 causes the printing unit 1-4 to print the image data sent from the facsimile control unit 1-1. The CPU 2-1 of the facsimile control unit 1-1 checks whether the page has been printed or not (S1414). When printing of the page is finished, the CPU 2-1 checks whether the page has been correctly printed or not (S1415). If the page has not been correctly printed, the CPU 2-1 shifts to step S1411. If the page has been correctly printed, the CPU 2-1 checks whether a next page is printed or not (S1416). If a next page is printed, the CPU 2-1 shifts to step S1407.

On the other hand, if the printing unit 1-4 is not able to print data in step S1410, the CPU 2-1 performs an error process (e.g. displaying an error on the LCD) in step S1417.

In a case where a copy instruction is entered after storing all pages of the original documents, or in a case where the apparatus makes plural copies of the original documents in page order, the apparatus stores image data corresponding to all pages of the original documents into the storage memory 2-11, and after that, the apparatus prints the image data stored in the storage memory 2-11. For example, in a case where a printing instruction is generated by setting the facsimile control unit 1-1 or the host 1-5 after all pages are stored into the storage memory 2-11, or in a case where printing data in the order of page number is instructed and where an operator instructs the apparatus to print plural pages of the documents, the CPU 2-1 stores image data corresponding to all pages into the storage memory 2-11. After that, the facsimile control unit 1-1 and the data converting unit 1-3 cause the printing unit 1-4 to print the stored image data. But if the operator does not instruct the apparatus to print plurals pages, the apparatus determines a page to be printed, and does not perform a printing control in the order of page number.

Next, facsimile transmission of read image data will be described as follows.

The CPU 2-1 of the facsimile control unit 1-1 causes the scanner unit 2-7 to read an original document in accordance with an instruction entered from the operation unit 2-8. The read image data is processed, converted, coded and sent to the line via the NCU 2-5 under control by the CPU 2-1.

Figure 15:
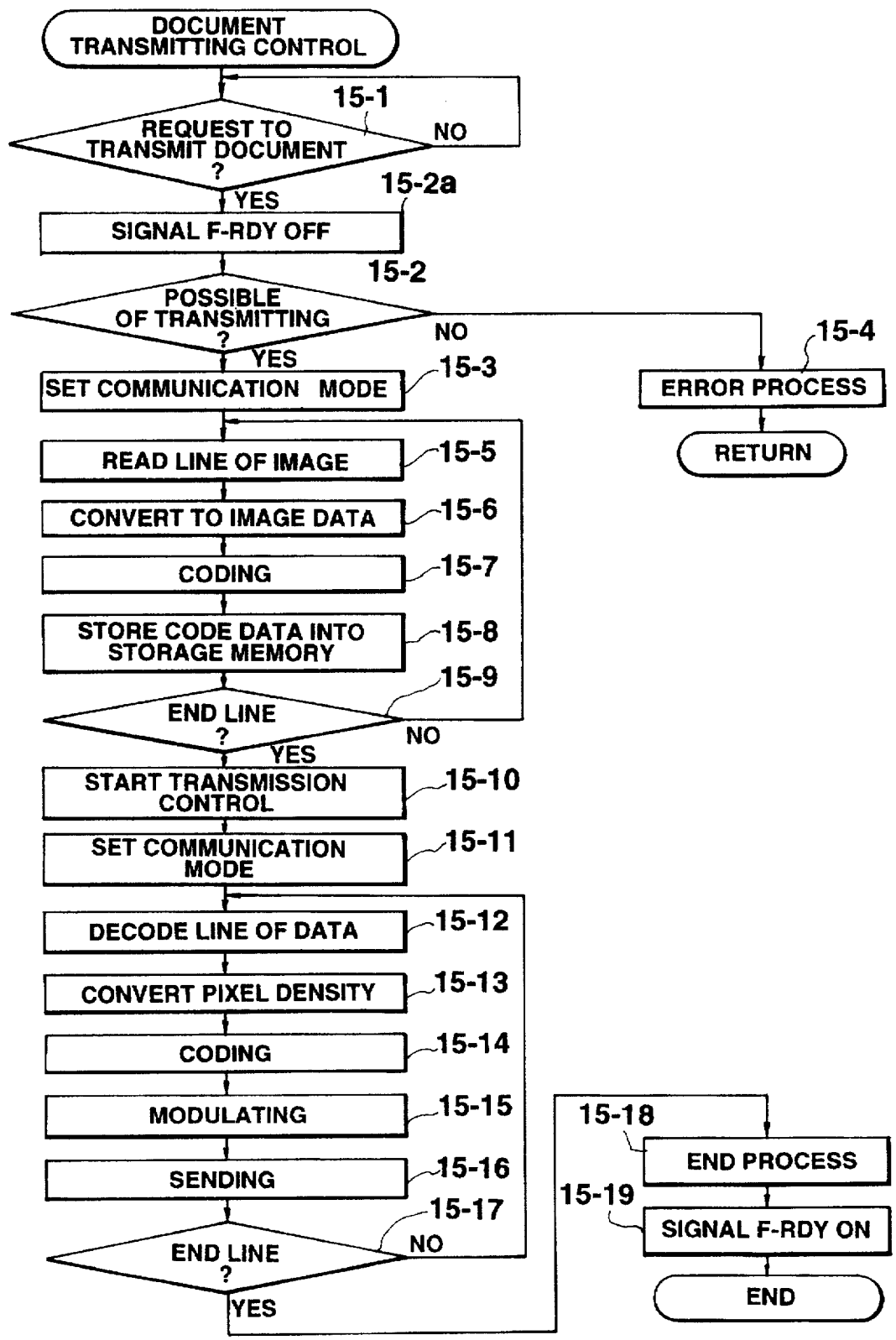
FIG. 15 is a flow chart showing an operation of facsimile transmission of read image data.
Figure 16:
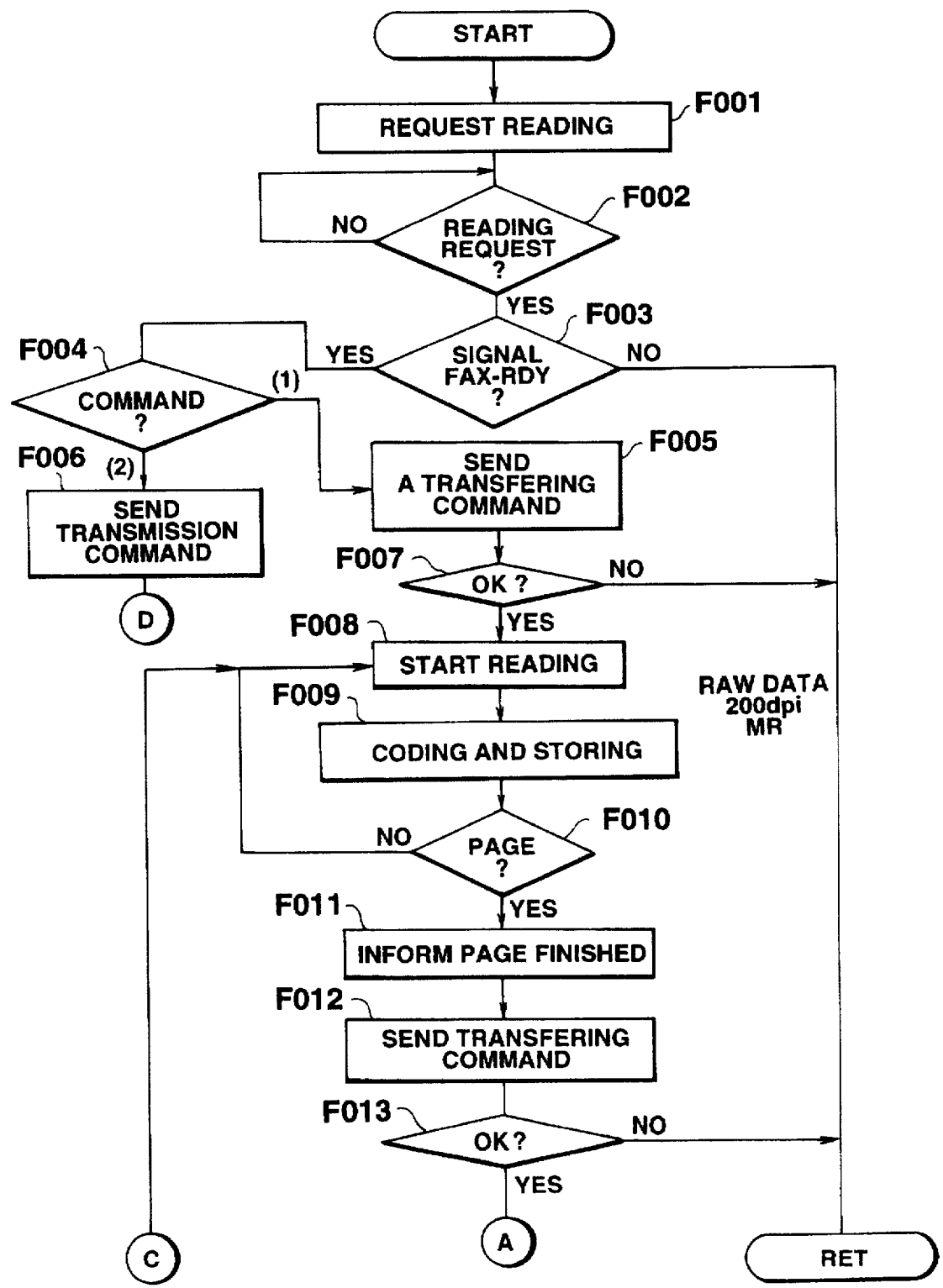
FIG. 16 through FIG. 19 together form a flow chart showing a transmitting/transferring operation of read image data under control of the host.
Figure 17:
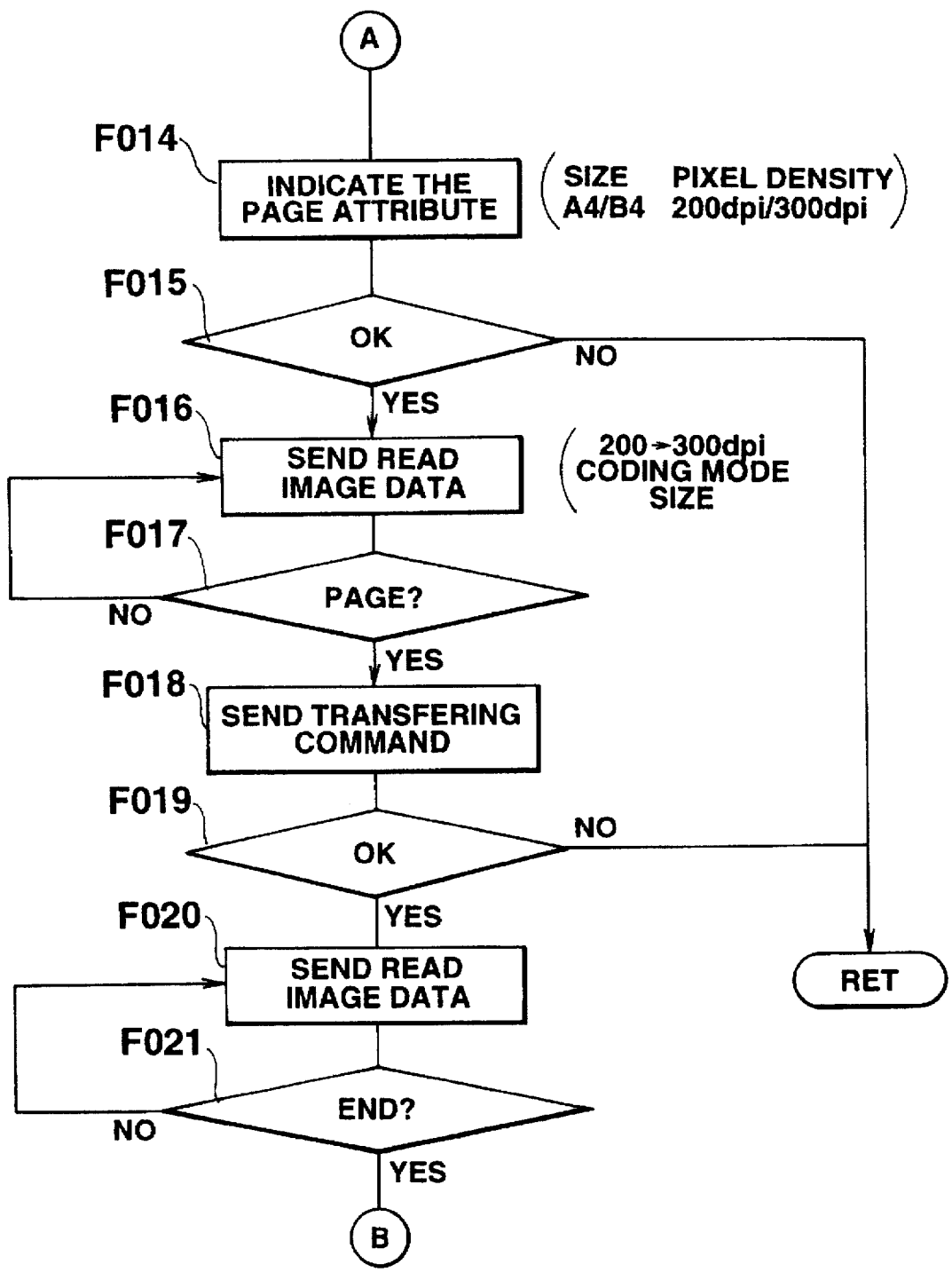
Figure 18:
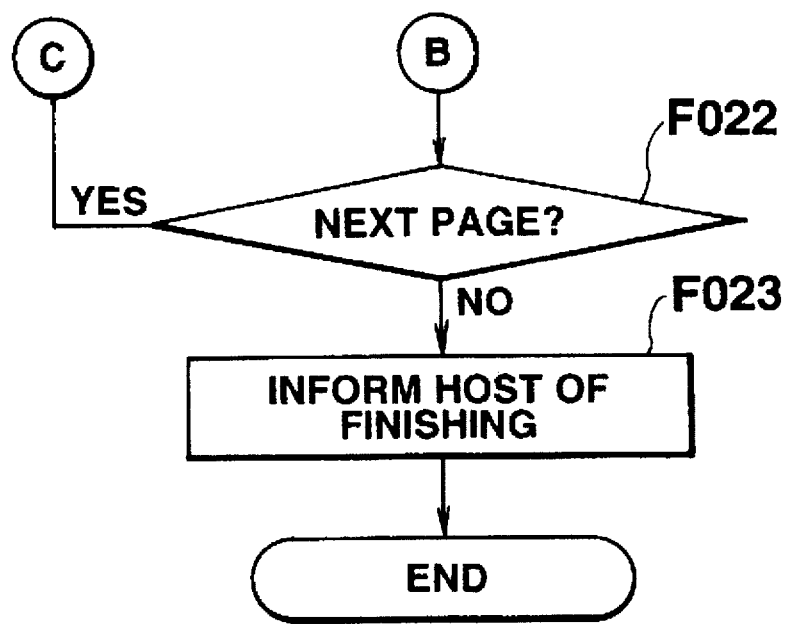
Figure 19:
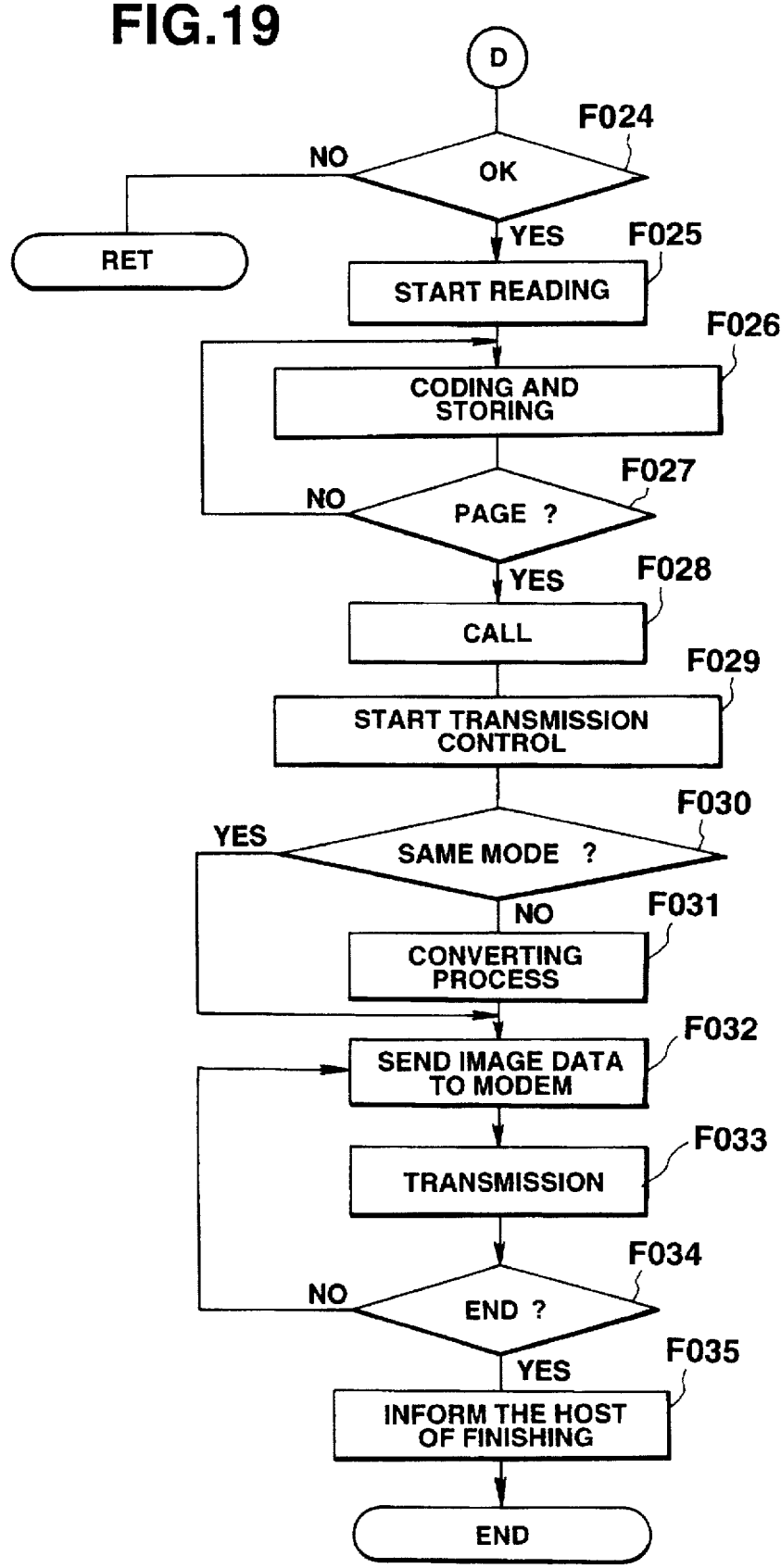

FIG. 15 is a flow chart showing a control operation of the CPU 2-1 in facsimile transmission of read image data.

The CPU 2-1 checks whether a document transmission request is entered or not (15-1). If a document transmission request is entered, the CPU 2-1 sets the signal F-RDY to be off (15-2), and detects whether a document transmission is possible or not (15-2a). If a document transmission is not possible, the CPU 2-1 performs an error message process (15-4). If a document transmission is possible, the CPU 2-1 sets a document transmission mode in accordance with the document transmission request (15-3), causes the scanner unit 2-7 to read a line of image (15-5), causes the image processing unit 2-6 to convert the line image into a line of image data (15-6), causes the coding unit 2-13a to code the line of image data by a predetermined coding method (15-7), stores the code data into the storage memory 2-11 (15-8), and discriminates whether the document is finished or not (15-9). If the document is not finished, the CPU 2-1 shifts to step 15-5 so as to process a next line. If the document is finished, the CPU 2-1 performs a transmission control (15-10), and sets a transmission mode in accordance with a protocol in the transmission control (15-11). The CPU 2-1 reads a line of image data from the storage memory 2-11, and causes the converting unit 2-12 to convert the pixel density of the decoded line data so as to be a proper pixel density for transmission, if this is necessary (15-13), causes the coding unit 2-13a to code the line data by a coding method decided in the protocol (15-14), causes the modem 2-4 to modulate the code data (15-15), sends the modulated data to the line via the NCU 2-5 (15-16), and discriminates whether all lines have been sent or not (15-17). If all lines have not been sent, the CPU 2-1 shifts to step 15-12. If all lines have been sent, the CPU 2-1 performs an end procedure so as to finish the transmission control (15-18), and sets the signal F-RDY to be on (15-19).

Next, an operation of transferring read image data to the host 1-5 under control by the host 1-5 or facsimile transmission of read image data under control by the host 1-5 will be described as follows.

FIGS. 16 through 19 together form a flow chart showing an operation by the data converting unit 1-3 and the facsimile control unit 1-1.

Command communication between the host 1-5 and the data converting unit 1-3 is performed on the basis of PDL. In a case where the data converting unit 1-3 sends commands from the host 1-5 to the facsimile control unit 1-1, the data converting unit 1-3 converts the commands from the host 1-5 into commands for the facsimile control unit 1-1, and sends the converted commands to the facsimile control unit 1-1.

After confirming a document to be set in the scanner unit 2-7, the host 1-5 sends a command to request reading of the document (to transfer read image data to the host 1-5, or to transmit read image data to the line) to the data converting unit 1-3 (F001). The data converting unit 1-3 checks whether this command is received from the host 1-5 or not (F002). If the command is received, the data converting unit 1-3 checks whether the scanner 2-7 of the facsimile control unit 1-1 is ready or not (F003). If the scanner 2-7 is ready, the data converting unit 1-3 analyzes the reading request command, and discriminates whether the reading request command is to transfer read image data to the host 1-5 (process 1) or to transmit read image data to the line (process 2) (F004). If the reading request command is to perform the first process, the data converting unit 1-3 sends a host storage command to the facsimile control unit 1-1 (F005). On the other hand, if the reading request command is to perform the second process, the data converting unit 1-3 sends a facsimile transmission command to the facsimile control unit 1-1 (F006).

In a case where the status of the facsimile control unit 1-1 is not ready when the data converting unit 1-3 sends the host storage command (F007), the data converting unit 1-3 informs the host 1-5 that the facsimile control unit 1-1 is not able to read a document. On the other hand, in a case where the status of the facsimile control unit 1-1 is ready at that time (F007), the facsimile control unit 1-1 starts to read the document by the scanner 2-7 (F008), codes the read image data by the coding unit 2-13A (e.g. by the MR coding method), and stores the code data into the storage memory 2-11 in line units (F009). The facsimile control unit 1-1 checks whether reading of a page has been finished or not (F0101). If reading of a page has been finished, the facsimile control unit 1-1 informs the data converting unit 1-3 by status information that image data of the page has been stored in the storage memory 2-11 (F011). The data converting unit 1-3 sends a data transfer command to the facsimile control unit 1-1 in response to the status information in step F011 (F012). In a case where the facsimile control unit 1-1 accepts the data transfer command (F013), the facsimile control unit 1-1 indicates a page attribute (e.g. size/dpi) to the data converting unit 1-3 (F014). If the page attribute is accepted by the data converting unit 1-3 (F015), the facsimile control unit 1-1 starts to send the image data stored in the storage memory 2-11 to the data converting unit 1-3 (F016). If the image data has to be converted into suitable data for the data converting unit 1-3, the facsimile control unit 1-1 converts the image data into suitable data by the resolution converting unit 2-12, and sends the converted image data to the data converting unit 1-3 (F016). If sending of the image data is completed (F017), the image data is stored in the memory 4-7 by the data converting unit 1-3. Then, the data converting unit 1-3 informs the host 1-5 that the data converting unit 1-3 is able to send the image data from the facsimile control unit 1-1 to the host 1-5 (F018). If the host 1-5 is ready (F019), the data converting unit 1-3 sends the image data stored in the memory 4-7 to the host 1-5 (F020). When the data converting unit 1-3 finishes sending the image data (F021), the data converting unit 1-3 checks whether a next page is in the facsimile control unit 1-1 or not (F022). If a next page is in the facsimile control unit 1-1, the data converting unit 1-3 informs the facsimile control unit 1-1 that the data converting unit 1-3 is ready. The facsimile control unit 1-1 shifts to step F008 and reads a next page. If a next page is not in the facsimile control unit 1-1, the data converting unit 1-3 informs the host 1-5 of finishing transferring the read image data (F023).

On the other hand, in a case where the data converting unit 1-3 sends the facsimile transmission command, which includes information data (e.g. telephone number) to the facsimile control unit 1-1 in step F006, the data converting unit 1-3 checks the status of the facsimile control unit 1-1 (F024). If the status is not ready, the data converting unit 1-3 informs the host that the reading request command is not accepted. If the status is ready, the facsimile control unit 1-1 starts a reading operation (F025), codes the read image data by the coding unit 2-13a, and stores the code data into the storage memory 2-11 (F026). When the facsimile control unit 1-1 detects that reading of a page has been finished (F027), the facsimile control unit 1-1 calls a destination in accordance with the information data (telephone number) included in the facsimile transmission command (F028). The facsimile control unit 1-1 starts a transmission control (protocol) by using the modem 2-4 (F029), and checks whether it is necessary to convert the read image data or not, on the basis of a response from the destination in the protocol (F030). If it is necessary to convert the read image data, the facsimile control unit 1-1 converts the read image data (e.g. coding method, size, pixel density) into suitable image data to the destination (F031). For example, in a case where the pixel density (e.g. 300 dpi) of the read image data is different from the pixel density (e.g. 200/400 dpi) of the destination, the facsimile control unit 1-1 decodes the image data stored in the storage memory 2-11 by the decoding unit 2-13b, converts the pixel density of the decoded image data by the resolution converting unit 2-12, and codes the converted image data by the coding unit 2-13a. The facsimile control unit 1-1 sends the image data to the destination through the modem 2-4 and the NCU 2-5 (F032, F033) until all image data is sent (F034). If the facsimile transmission is finished (F034), the facsimile control unit 1-1 informs the host 1-5 through the data converting unit 1-3 that the facsimile transmission has been finished (F035).

Next, an operation of transferring received image data or received data to the host 1-5 will be described as follows.

The facsimile control unit 1-1 receives image data, and store received image data into the storage memory 2-11. The facsimile control unit 1-1 decides whether to transfer the received image data to the host 1-5 or to cause the printing unit 1-4 to print the received imaged data, and sequentially sends the received image data to the data converting unit 1-3.

Figure 20:
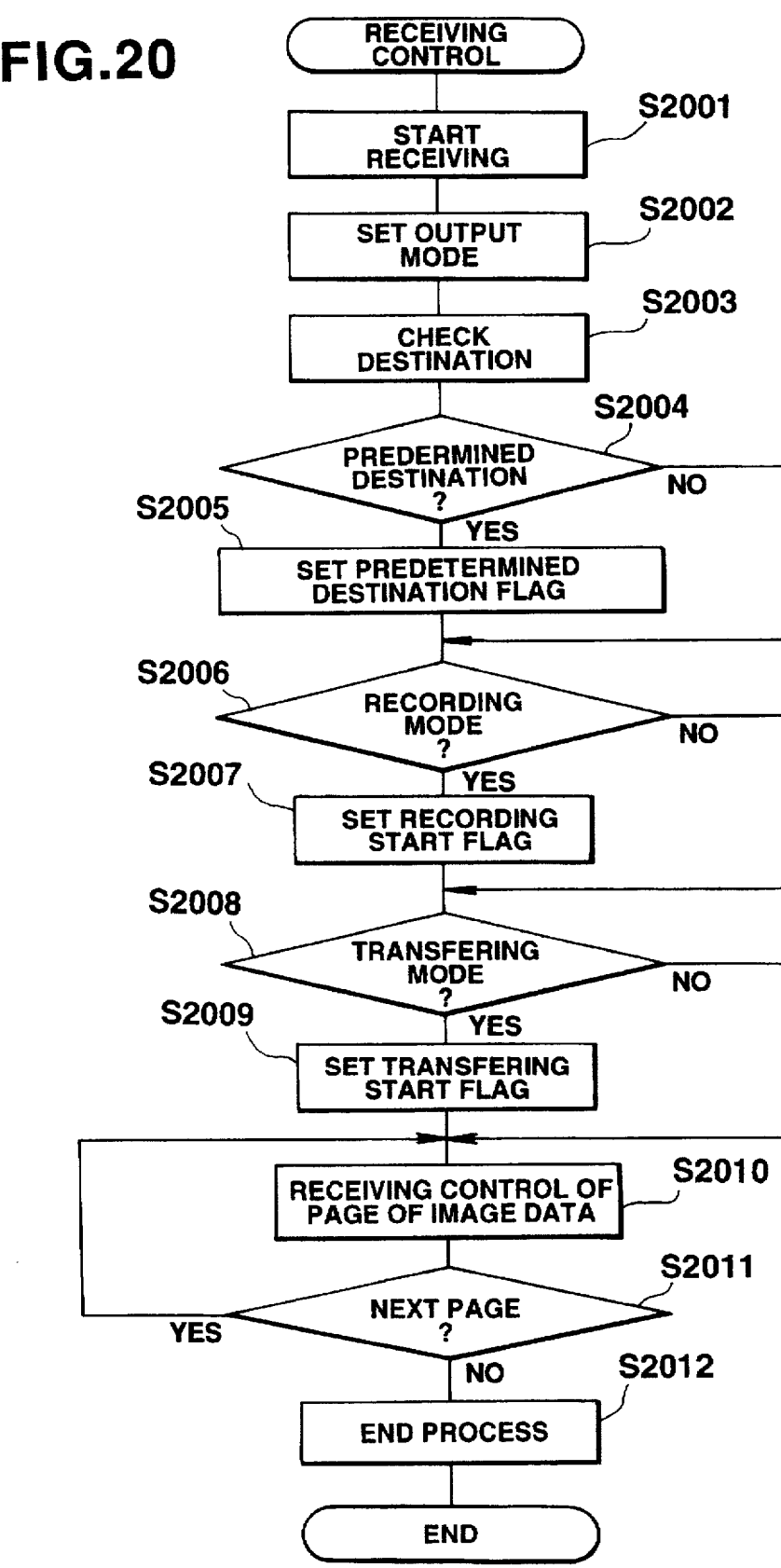
FIG. 20 is a flow chart showing a transferring operation of received data.

FIG. 20 is a flow chart showing a control operation of the CPU 2-1 of the facsimile control unit 1-1 in the operation of transferring the received image data to the host 1-5.

The CPU 2-1 performs a receiving control as in the control of FIG. 8 (S2001), and sets an output destination of received image data (S2002). In this embodiment, an output destination of received image data is the printing unit 1-4 or the host 1-5, and is decided in accordance with an output mode which is to switch recording and transferring on the basis of a sending station of the image data (a calling station). The output mode has three kinds of conditions (1. a recording mode: output received image data to the printing unit 1-4; 2. a transferring mode: output received image data to the host 1-5; 3. a recording/transferring mode: output received data to the host 1-5 after outputting it to the printing unit 1-4).

Further, it is possible to switch recording or transferring in accordance with a calling station. For example, image data from a predetermined calling station is output to the host 1-5, and image data from other calling stations is output to the printing unit 1-4.

The CPU 2-1 checks destination information (e.g. telephone number, name) included in a protocol signal from the destination (a calling station) (S2003), and discriminates whether the destination is a predetermined destination or not (S2004). If the destination is the predetermined destination, the CPU 2-1 sets an identifying receiving flag to be on (S2005). If the destination is not the predetermined destination, the CPU 2-1 sets the identifying receiving flag to be off.

The CPU 2-1 discriminates whether the output mode is the recording mode (or the recording/transferring mode) or not (S2006). If the output mode is the recording mode or the recording/transferring mode, the CPU 2-1 sets a printing start flag to be on (S2007).

The CPU 2-1 discriminates whether the output mode is the transferring mode (or the recording/transferring mode) or not (S2008). If the output mode is the transferring mode or the recording/transferring mode, the CPU 2-1 sets a transferring start flag to be on (S2009).

The CPU 2-1 performs a receiving control of a page, receives image data, causes the codec unit 2-13 to decode and code the received image data, and stores the received image data coded by a predetermined coding method into the storage memory 2-11 (S2010). After finishing receiving the page of image data, the CPU 2-1 discriminates whether a next page is received or not (S2011). If a next page is received, the CPU 2-1 shifts to step S2010 so as to receive a next page of image data. If a next page is not received, the CPU 2-1 performs an end procedure so as to finish the receiving control (S2012).

Figure 21:
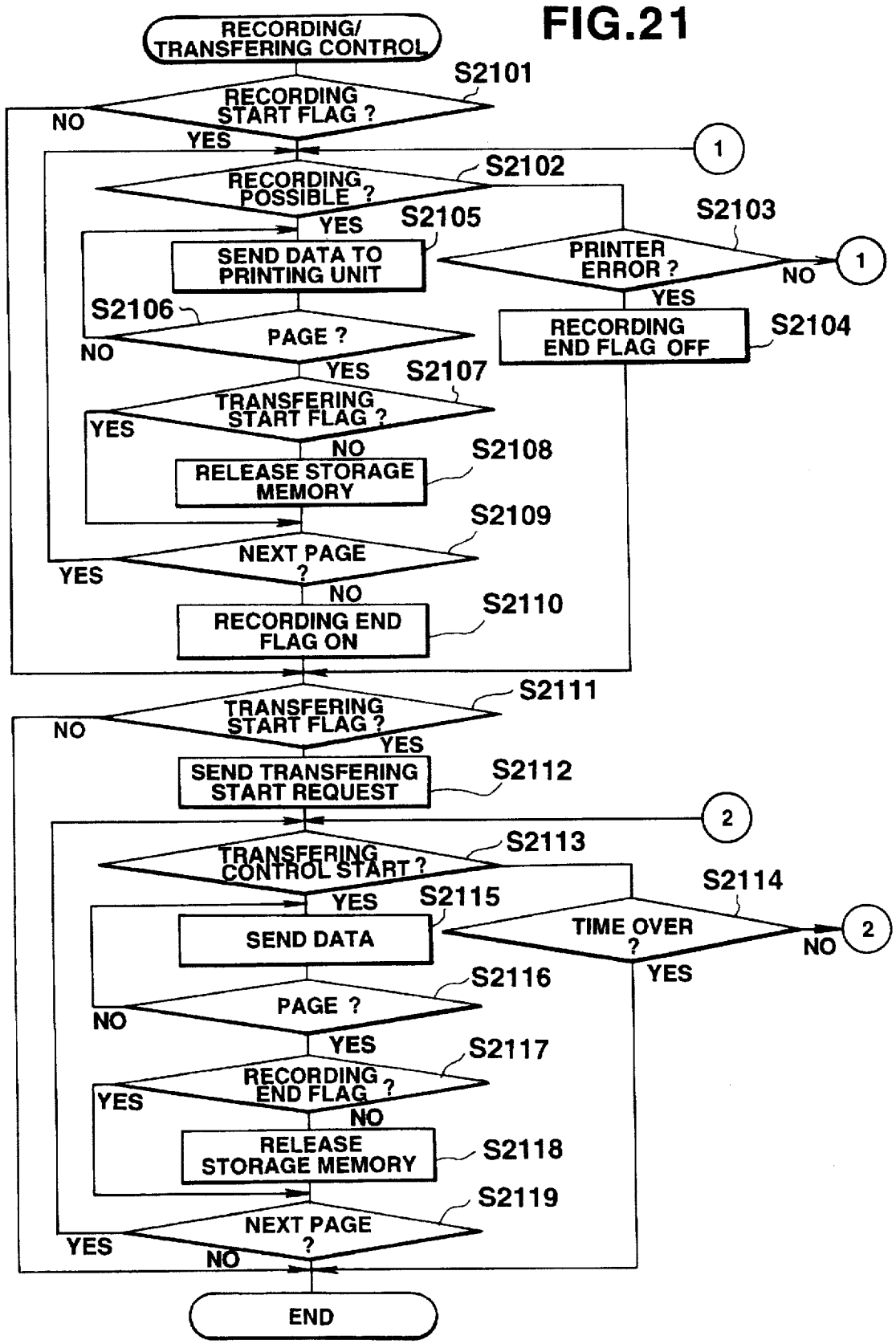
FIG. 21 is a flow chart showing a transferring printing operation of received data.

FIG. 21 is a flow chart showing a transferring/printing control of the CPU 2-1 of the facsimile control unit 1-1. This transferring/printing control is performed by the CPU 2-1 after having received a page of image data.

The CPU 2-1 discriminates whether the output mode corresponding to the image data stored in the storage memory 2-11 is the recording mode or not, on the basis of the recording start flag (S2101). If the output mode is not the receiving mode, the CPU 2-1 shifts to step S2111. If the output mode is the receiving mode, the CPU 2-1 requests the status of the printing unit 1-4 to the data converting unit 1-3, and checks whether the printing unit 1-4 is able to print data or not (S2102). If the printing unit 1-4 is not able to print data, the CPU 2-1 checks whether the printing unit 1-4 is in an error condition (e.g. paper jam, no paper) (S2103). If the printing unit 1-4 is not in an error condition, the CPU 2-1 shifts to step S2102 so as to wait for the printing unit 1-4 to be capable of printing. If the printing unit 1-4 is in an error condition, the CPU 2-1 sets a recording finishing flag to be off, and shifts to step S211 (S2104).

On the other hand, if the printing unit 1-4 is able to print data in step S2102, the CPU 2-1 sends the received image data in line units to the printing unit 1-4 through the data converting unit 1-3 (S2105), and discriminates whether printing of the page is finished or not (S2106). If printing of the page is not finished, the CPU 2-1 shifts to step S2105 so as to continue to send the page of received image data. If printing of the page is finished, the CPU 2-1 checks whether the transferring start flag corresponding to the image data is on or off (S2107). If the transferring start flag is off, the CPU 2-1 releases the memory area of the storage memory 2-11 where the page is stored (S2108), and discriminates whether a next page has been stored in the storage memory 2-11 or not (S2109). If a next page has been stored, the CPU 2-1 shifts to step S2102 so as to send the next page of image data to the printing unit 1-4. If a next page has not been stored, the CPU 2-1 sets the recording finishing flag to be on (S2110), and discriminates whether the transferring flag corresponding to the image data is on or off (S2111). If the transferring flag is off, the CPU 2-1 finishes the printing/ transferring control. If the transferring flag is on, the CPU 2-1 sends a transferring start request to the host 1-5 through the data converting unit 1-3 (S2112), and discriminates whether a transferring start command from the host 1-5 is received through the data converting unit 1-3 or not before a predetermined time has elapsed from sending the transferring start request (S2113, S2114). If the transferring start command is not received before the predetermined time has elapsed, the CPU 2-1 finishes the printing/transferring control. If the transferring start command is received before the predetermined time has elapsed, the CPU 2-1 sends the page of image data in line units to the host 1-5 through the data converting unit 1-3 and the I/F unit 1-2 (S2115), and discriminates whether transferring of the page is finished or not (S2116). If transferring of the page is finished, the CPU 2-1 discriminates whether the recording finishing flag is off or not (S2117). If the recording finishing flag is off, the CPU 2-1 releases the memory area of the storage memory 2-11 where the page has been stored (S2118), and discriminates whether a next page has been stored in the storage memory 2-11 or not (S2119). If a next page has been stored, the CPU 2-1 shifts to step S2115 so as to transfer the next page of image data. If a next page has not been stored, the CPU 2-1 finishes the printing/transferring control.

Next, an output operation of a report relating to facsimile communication will be described as follows.

Figure 22:
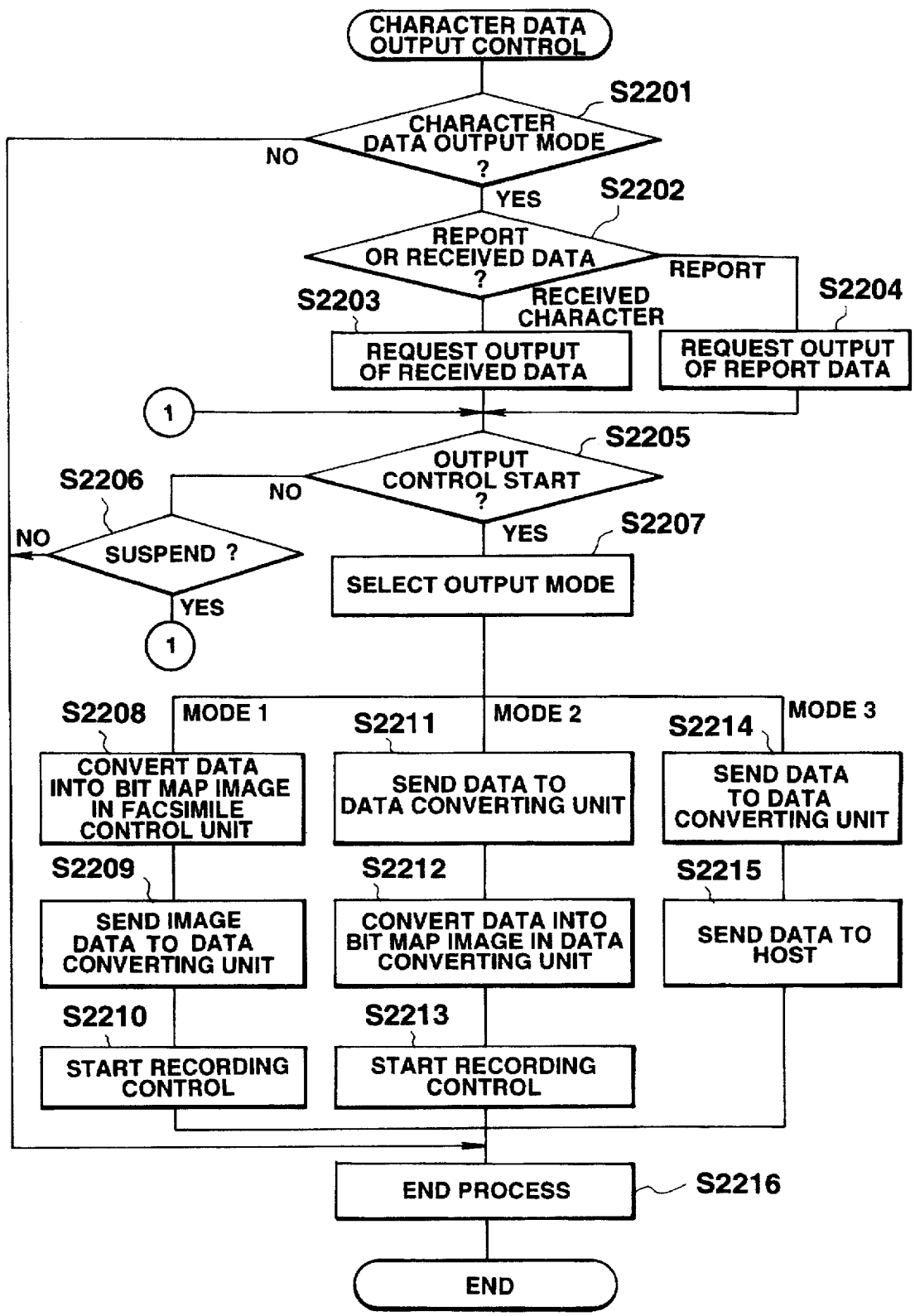
FIG. 22 is a flow chart showing an output operation of character data.

FIG. 22 is a flow chart showing an output operation of received character data and an output operation of a report relating to facsimile communication. The character data is character code data (e.g. ASCII code), and is used in data communication (e.g. computer communication).

The report relating to facsimile communication is report information which is edited on the basis of setting data and managing data stored in the RAM 2-3 of the facsimile control unit 1-1. The report image data is generated by converting character code data into bit image data.

In this embodiment, the output operation of character data and the report has three modes as follows.
1) mode 1

The facsimile control unit 1-1 converts character code into a bit map image on the basis of font data stored in the ROM 2-2, stores the bit map image into the line buffer 2-13c of the codec unit 2-13, codes the bit map image by the codec unit 2-13 as received image data, and stores coded character image into the storage memory 2-11.

In a case where font data has 24 dots in a direction of sub-scanning, the facsimile control unit 1-1 performs a coding operation corresponding a row of character code data twenty four times, and performs a coding operation for white lines between a row of character code and a next row of character code. A printing operation is as same as the receiving control and the printing control of received image data (FIG. 8, FIG. 9) mentioned above.
2) mode 2

The facsimile control unit 1-1 sends the character code data stored in the RAM 2-3 to the data converting unit 1-3, and the data converting unit 1-3 converts the character code data into a bit map image by using font data of the data converting unit 1-3. The data converting unit 1-3 adds control codes (commands) used in printing data from the host 1-5 to the character code data so as to perform high quality printing in character size, font, row pitch and spaces etc. Further, in a case where the data converting unit 1-3 uses graphic commands, it is easy to make a report in which image data and character data are mixed as an error report etc.
3) mode 3

The facsimile control unit 1-1 sends the character code data to the data converting unit 1-3 through the I/F unit 1-2, and the data converting unit 1-3 sends the character code data to the host 1-5. In the mode 3, received character code data or a facsimile report is displayed on a CRT display by the host 1-5. The host 1-5 might cause the apparatus according to the present embodiment to print the displayed character data or facsimile report.

In the output operation of received character code data, one of the three modes described above is selected in accordance with a destination (a sending station, a calling station). In the output operation of facsimile report, one of the three modes described above is selected by setting in the facsimile control unit 1-1 or the host 1-5.

The facsimile control until 1-1 discriminates whether data to be output is character code data or image data (S2201). If data to be output is image data, the facsimile control unit 1-1 finishes the output operation (S2216).

If data to be output is character code data, the facsimile control unit 1-1 discriminates whether the character code data is received character code data or facsimile report data (S2202). If the character code data is received character code data, the facsimile control unit 1-1 sends an output request of received data to the data converting unit 1-3 in accordance with a mode of the output operation (S2203). If the character code data is facsimile report data, the facsimile control unit 1-1 sends a request for setting the output mode to the host 1-5 through the data converting unit 1-3 so as to decide a mode of the output operation (S2204).

The facsimile control unit 1-1 checks the condition of the printing unit 1-4 and the host 1-5, and discriminates whether outputting of the character data is possible or not (S2205). If outputting of the character data is impossible, the facsimile control unit 1-1 discriminates whether or not to stop the output control (S2206). In a case where the printing unit 1-4 is in an error condition, or in a case where the host 1-5 is not connected to this apparatus, the facsimile control unit 1-1 stops the output control. If outputting of the character data is possible, the facsimile control unit 1-1 selects one of the modes 1, 2 and 3 in accordance with the setting condition in the apparatus and the setting condition in the host 1-5.

In a case where the mode 1 is selected in step S2207, the facsimile control unit 1-1 converts the character code data into a bit map image by font data stored in the ROM 2-2, codes the bit map image by the codec unit 2-13, and stores the code data of the bit map image into the storage memory 2-11 (S2208). After finishing storing code data, the facsimile control unit 1-1 performs a transferring operation of the stored data (S2209). In the transferring operation, the facsimile control unit 1-1 decodes stored code data by the decoding unit 2-13b, converts the pixel density of decoded data by the resolution converting unit 2-12, stores the converted data into the line buffer 2-9, and sends the image data stored in the line buffer 2-9 to the data converting unit 1-3 through the I/F unit 1-2. The data converting unit 1-3 causes the printing unit 1-4 to print received image data (S2210).

In a case where the mode 2 is selected in step S2207, the facsimile control unit 1-1 sends the character code data stored in the storage memory 2-11 to the data converting unit 1-3 through the I/F unit 1-2 (S2211). The data converting unit 1-3 converts the character code data into a bit map image by using font data stored in the ROM 4-3 (S2212). In the converting process, the data converting unit 1-3 adds control codes (commands) used in printing data from the host 1-5 to the character code data so as to perform high quality printing. After finishing the converting operation, the data converting unit 1-3 causes the printing unit 1-4 to print the bit map image (S2213).

In a case where the mode 3 is selected in step S2207, the facsimile control unit 1-1 sends the character code data to the data converting unit 1-3 through the I/F unit 1-2 (S2214). The data converting unit 1-3 sends received character code data to the host 1-5 (S2215). The host 1-5 processes the character code data in accordance with software.

After finishing the output operation, the apparatus performs an end process so as to return to a standby condition (S2216).

Next, an operation by the operation unit 2-8 of the facsimile control unit 1-1 will be described as follows.

The operation unit 2-8 is used in an operation of the data converting unit 1-3 and the facsimile control unit 1-1. Therefore, in a control of the operation unit 2-8, three control operations as follows are selectively performed.

Control 1: the facsimile control unit 1-1 occupies the operation unit 2-8, and controls the operation unit 2-8.

Control 2: the data converting unit 1-3 occupies the operation unit 2-8, and controls the operation unit 2-8 through the I/F unit 1-2.

Control 3: the facsimile control unit 1-1 monitors the data converting unit 1-3, and controls the operation unit 2-8 in accordance with the result of monitoring the data converting unit 1-3.

Figure 23:
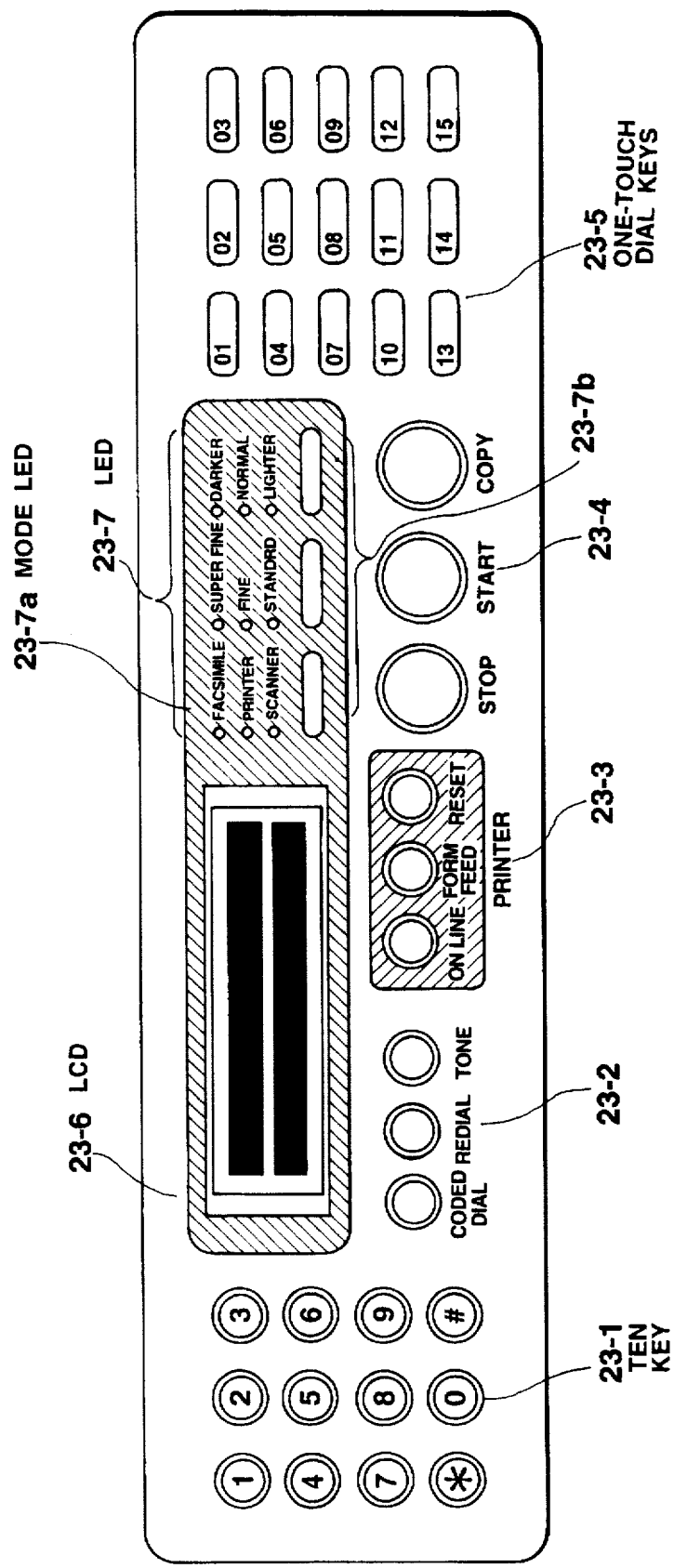
FIG. 23 is a view showing an operation unit.

FIG. 23 is a view showing an arrangement of keys, a LCD, and LEDs in the operation unit 2-8. Numeral 23-1 denotes ten keys for entering telephone number and copy number etc. Numeral 23-2 denotes coded dial/redial/tone keys for controlling coded dial, redial or switching tone and pulse dialing.

Numeral 23-3 denotes printer keys for setting modes in the data converting unit 1-3, and for controlling on-line/off-line etc.

Numeral 23-4 denotes stop/start/copy keys for stopping operations, and for starting operations etc.

Numeral 23-5 denotes one-touch dialing keys.

Numeral 23-6 denotes a LCD for displaying information from the data converting unit 1-3 and the condition of the facsimile control unit 1-1 etc.

Numeral 23-7 denotes LEDs for displaying the condition of the apparatus etc.

Numeral 23-7b denotes mode keys for selecting modes.

The printer keys 23-3 are valid in the printer mode, and are invalid in other modes. But in the printer mode, only the printer keys 23-3 are valid.

Mode switching keys 23-7b are provided for selecting one of a facsimile mode, a printer mode and a scanner mode. A LED 23-7a corresponding to selected mode is turned on, and is cyclically changed in accordance with a key enter. In the host/facsimile automatic switching operation described above, a LED corresponding to a mode which the apparatus is performing is turned on and off.

The printer keys 23-2 for the data converting unit 1-3 are valid only when a LED of the printer mode is turned on. In a case where this LED is not turned on, an input of the printer keys 23-2 is invalid.

The LCD 23-6 displays information by converting input data into data for displaying in accordance with predetermined character information. The input data is input by the facsimile control unit 1-1, or is sent from the data converting unit 1-3 through the I/F unit 1-2. The apparatus selects input data from the facsimile control unit 1-1 or input data from the data converting unit 1-3 in accordance with the condition of LED 23-7b and causes the LCD 23-6 to display the selected input data.

FIG. 24 is a view showing display examples by the LCD 23-6 and the LEDS 23-7b.

FIG. 24(a) shows the standby condition of the facsimile mode, when the display information is edited by the facsimile control unit 1-1.

FIG. 24(b) shows the standby condition of the printer mode, when the display information is edited by the data converting unit 1-3.

FIG. 24(c) shows the standby condition of the scanner mode, when the display information is edited by the facsimile control unit 1-1.

FIG. 24(d) shows the display condition when the apparatus performs the document transmission in the facsimile mode.

FIG. 24(e) shows the display condition when the apparatus performs the printing operation of data from the host 1-5 in the printer mode.

FIG. 24(f) shows the display condition when the apparatus performs the reading control in the scanner mode.

FIG. 24(g) shows the display condition when the apparatus performs the printing control of data from the host 1-5 in the facsimile priority mode of the PC/FAX automatic switching mode. In this case, the printer LED is turned on and off, and the facsimile control unit 1-1 monitors the data converting unit 1-3 and causes the LCD 23-6 to display suitable information. Further, in this case, the apparatus is the facsimile mode in standby condition.

FIG. 24(h) shows the display condition when the facsimile control unit 1-1 performs the receiving control in the host priority mode of the PC/FAX automatic switching mode. In this case, the facsimile LED is turned on and off, and the facsimile control units 1-1 causes the LCD 23-6 to display suitable information. Further, in this case, the apparatus is in the printer mode.

Figure 30:
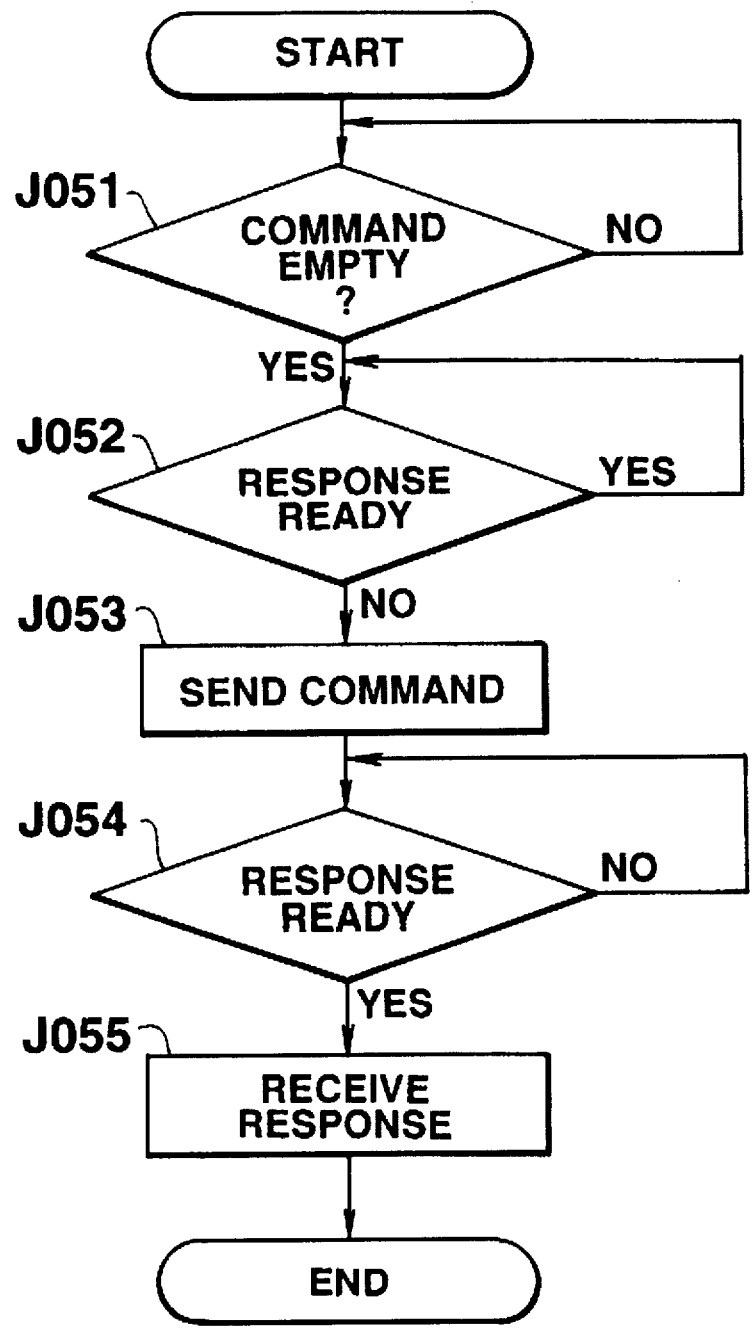
FIG. 30 is a flow chart showing an operation of a command/response communication in the data converting unit.

FIG. 30 is a flow chart showing a control operation when the data converting unit 1-3 sends commands.

The CPU 4-1 checks an empty signal so as to confirm that a buffer for sending a command is empty (J051). If the buffer is empty, the CPU 4-1 checks a ready signal so as to confirm that a buffer for a response is empty (J052). In a case where the apparatus is a single task system, those two steps described above unnecessary. However, in a case where the apparatus is a multi task system, those two steps are necessary.

If the buffer for a response is empty, the CPU 4-1 stores a command in the buffer for sending, sends the command (J053), and waits for response data to be stored in the buffer for a response (J054). If the response data is stored in the buffer for a response, the CPU 4-1 reads the response data from the buffer for a response (J055).

Figure 31:
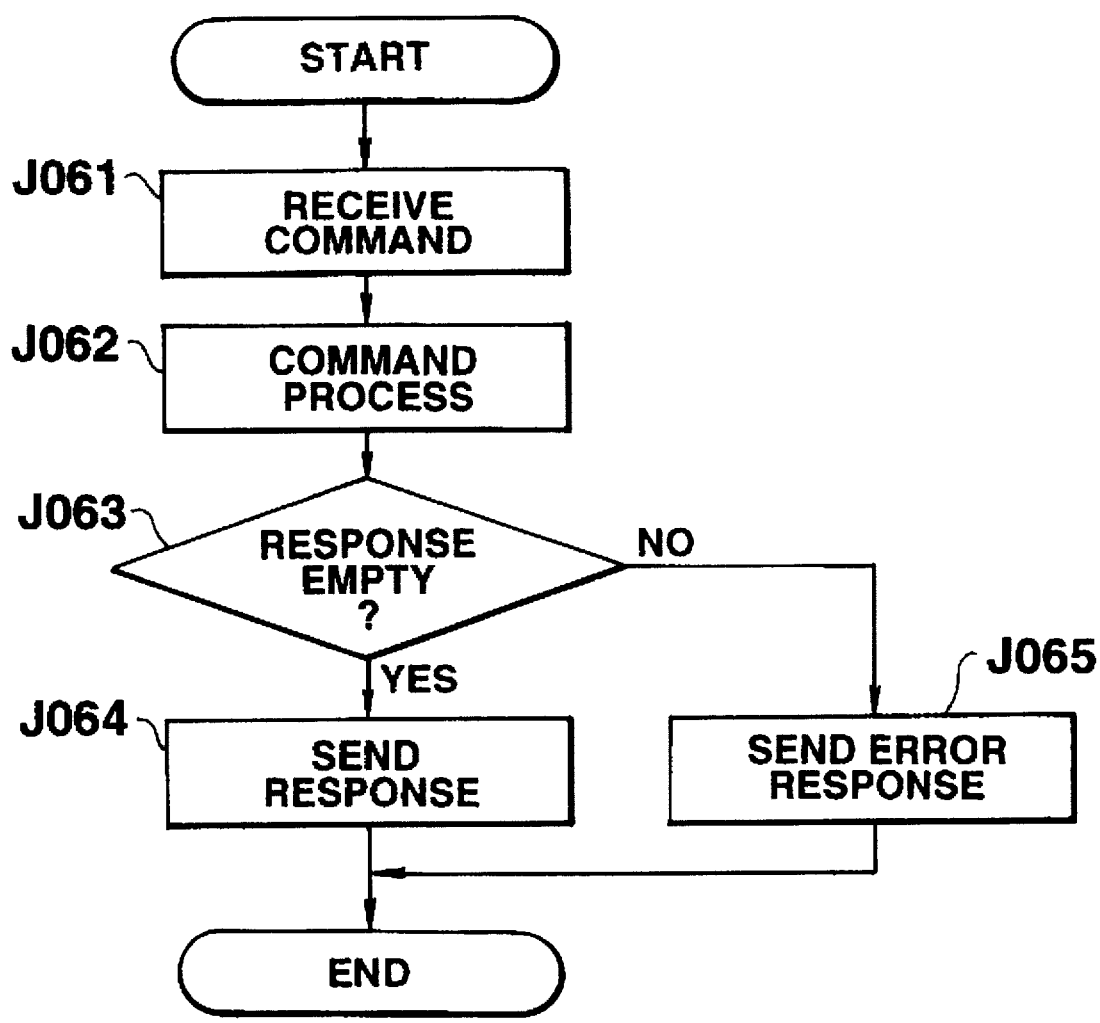
FIG. 31 is a flow chart showing an operation of the command/response communication in the facsimile control unit.

FIG. 31 is a flow chart showing a control operation when the facsimile control unit 1-1 receives commands from the data converting unit 1-3. This flow is started by an interrupt process in response to the ready signal.

The CPU 2-1 receives a command from the data converting unit 1-3 (J061), and performs a process corresponding to the received command (J062). The CPU 2-1 checks whether a buffer for response is empty or not (J063). If the buffer for response is not empty, the CPU 2-1 sends an error response to the data converting unit 1-3 (J065). If the buffer for response is empty, the CPU 2-1 sends response data corresponding to the command to the data converting unit 1-3 (J064).

(1) Command/response

For the data converting unit 1-3 and the facsimile control unit 1-1 to work together, those two units have to communicate control commands and responses thereto with each other.

In the command communication, the data converting unit 1-3 writes data according to the predetermined format into the command buffer for sending, and the facsimile control unit 1-1 sends response data corresponding to the command to the data converting unit 1-3 whenever the facsimile control unit 1-1 receives the command from the data converting unit 1-3.

(2) Key input data/display data communication.

The operation unit 2/8 is managed by the facsimile control unit 1-1. But, in some cases, the operation unit 2-8 has to perform key input and display which the data converting unit 1-3 needs. The keys in the operation unit 2-8 are separated into keys for the facsimile control unit 1-1 and keys for the data 1-1 converting unit 1-3. The facsimile control unit sends key data to the data converting unit 1-3 when a key for the data converting unit 1-3 is entered.

On the other hand, the data converting unit 1-3 sends display data to the facsimile control unit 1-1 through a buffer for display. The facsimile control unit 1-1 always stores the display data from the data converting unit into a virtual display buffer. The facsimile control unit 1-1 has another virtual display buffer from the facsimile control unit 1-1, too. The facsimile control unit 1-1 selects one of those virtual display buffers in accordance with a display switching key, causing the LCD to display one of two display data. The key data buffer and the display data buffer are individually used.

(3) Image data communication

Image data communication between the facsimile control unit 1-1 and the data converting unit 1-3 is performed in page units. In a control of data communication, the empty signal and the ready signal described above are used. If those signals are used as a request signal of DMA, the apparatus is able to perform data transferring at a high speed.

Figure 25:
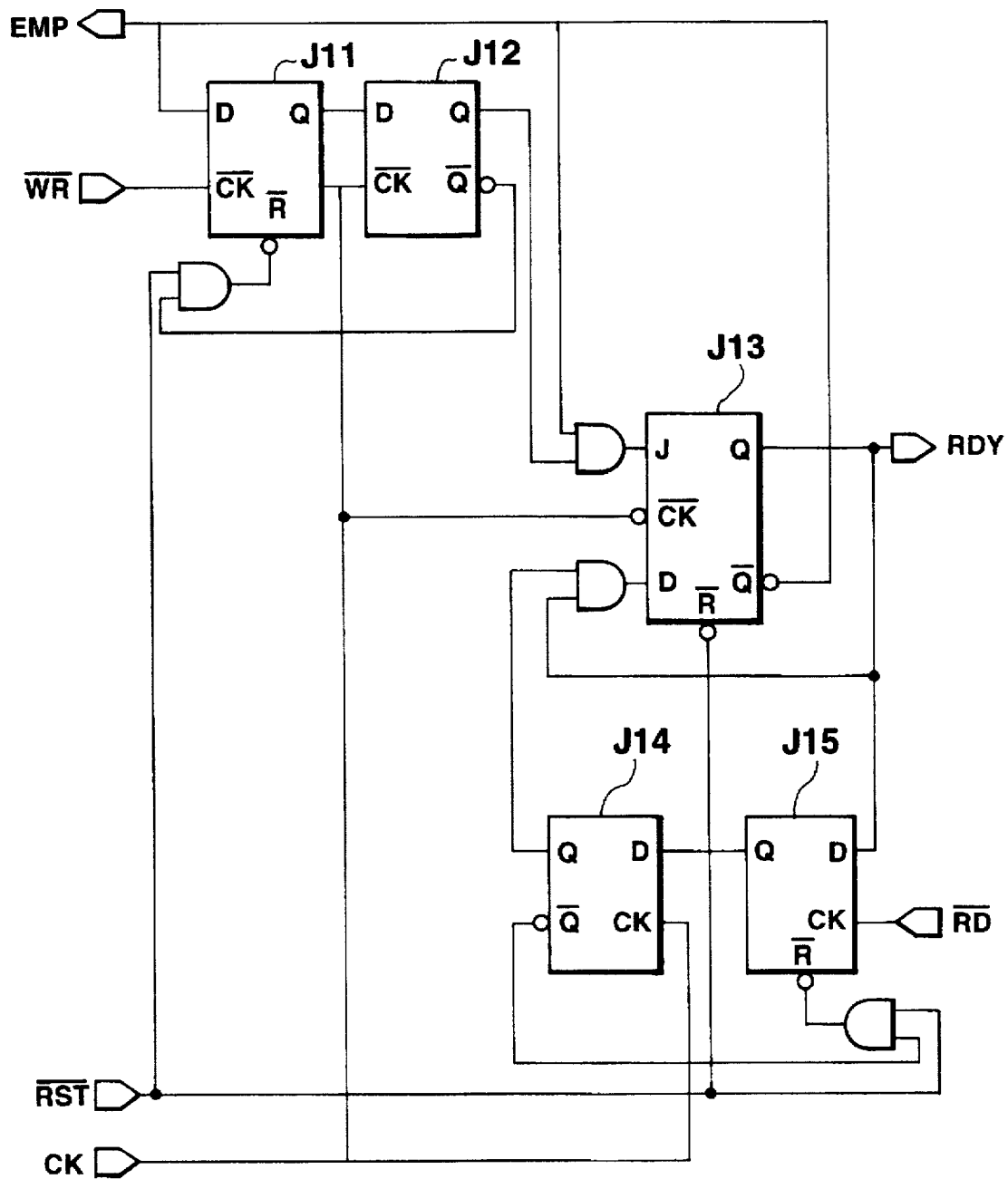
FIG. 25 is a block diagram showing a structure of a buffer control unit.
Figure 26:
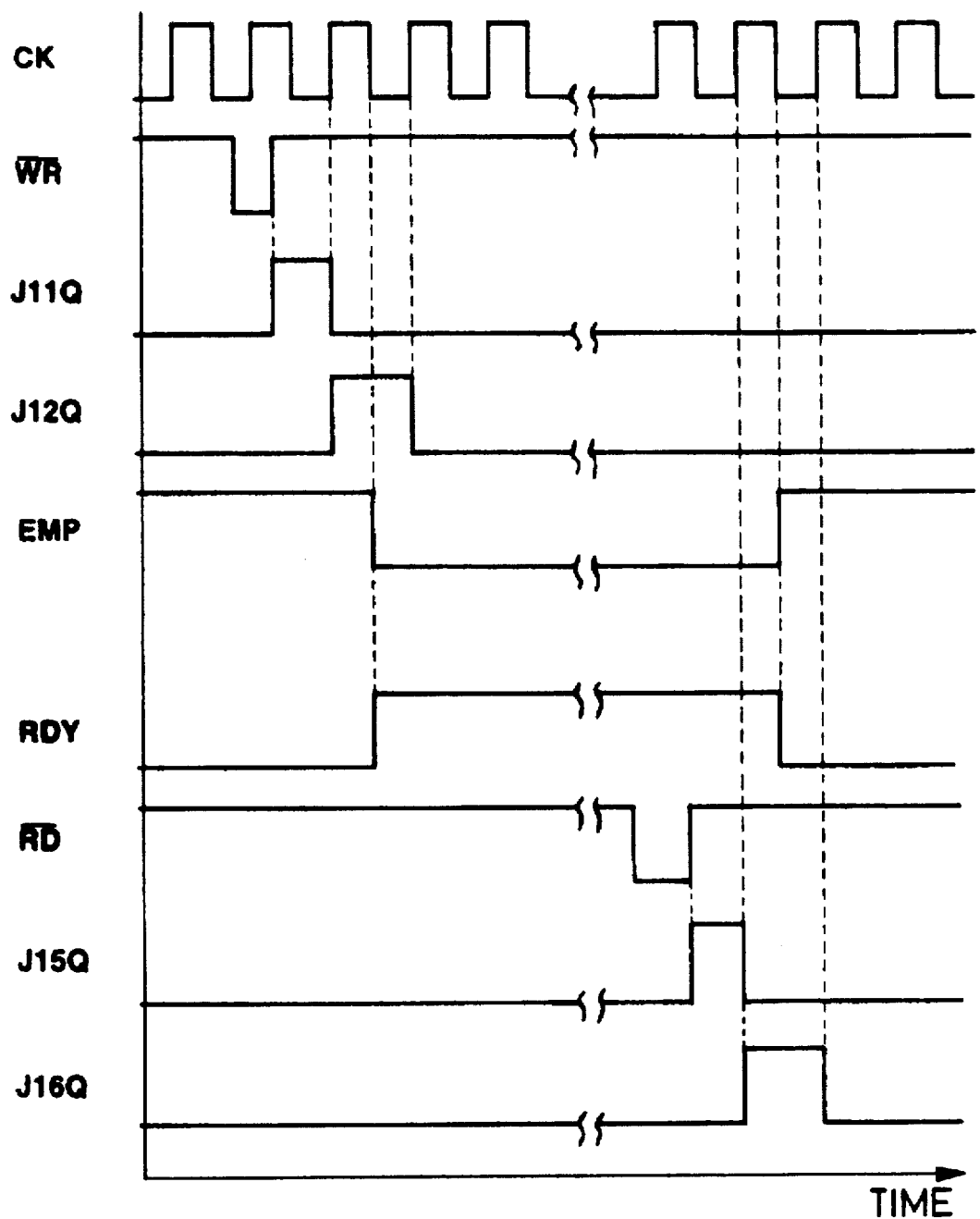
FIG. 26 is a timing chart showing an operation timing of the buffer control unit.

FIG. 25 is a block diagram showing a structure of a generating circuit for generating the ready signal and the empty signal in the buffer control unit 3-7 of FIG. 3. FIG. 26 is a timing chart showing an operation timing of the generating circuit of FIG. 25.

An output Q of a D-flip-flop J11 is set to be "1" by a write signal WR to a register buffer. The output Q of the D-flip-flop J11 is sent to a D-flip-flop J12 in accordance with a clock CK, and an output Q of the D-flip-flop J12 is set to be "1" by the output Q of the D-flip-flop J11. Thereby, the D-flip-flop J11 is reset, and a JK-flip-flop J13 is set. A signal RDY (the ready signal) becomes "1", and a signal EMP (the empty signal) becomes "0". Next, when data is read from the register buffer, the edge of a read signal RD sets a D-flip-flop J15 to be "1", and then an output Q of a D-flip-flop J14 is set to be "1" in response to a sampling of the clock CK. Thereby, the JK-flip-flop J13 is reset. The signal RDY becomes "0", and the signal EMP becomes "1".

As described above, the register for data communication between the data converting unit 1-3 and the facsimile control unit 1-1 was described. Those units communicate the following signals with each other by using I/O ports of each units.

Figure 32:
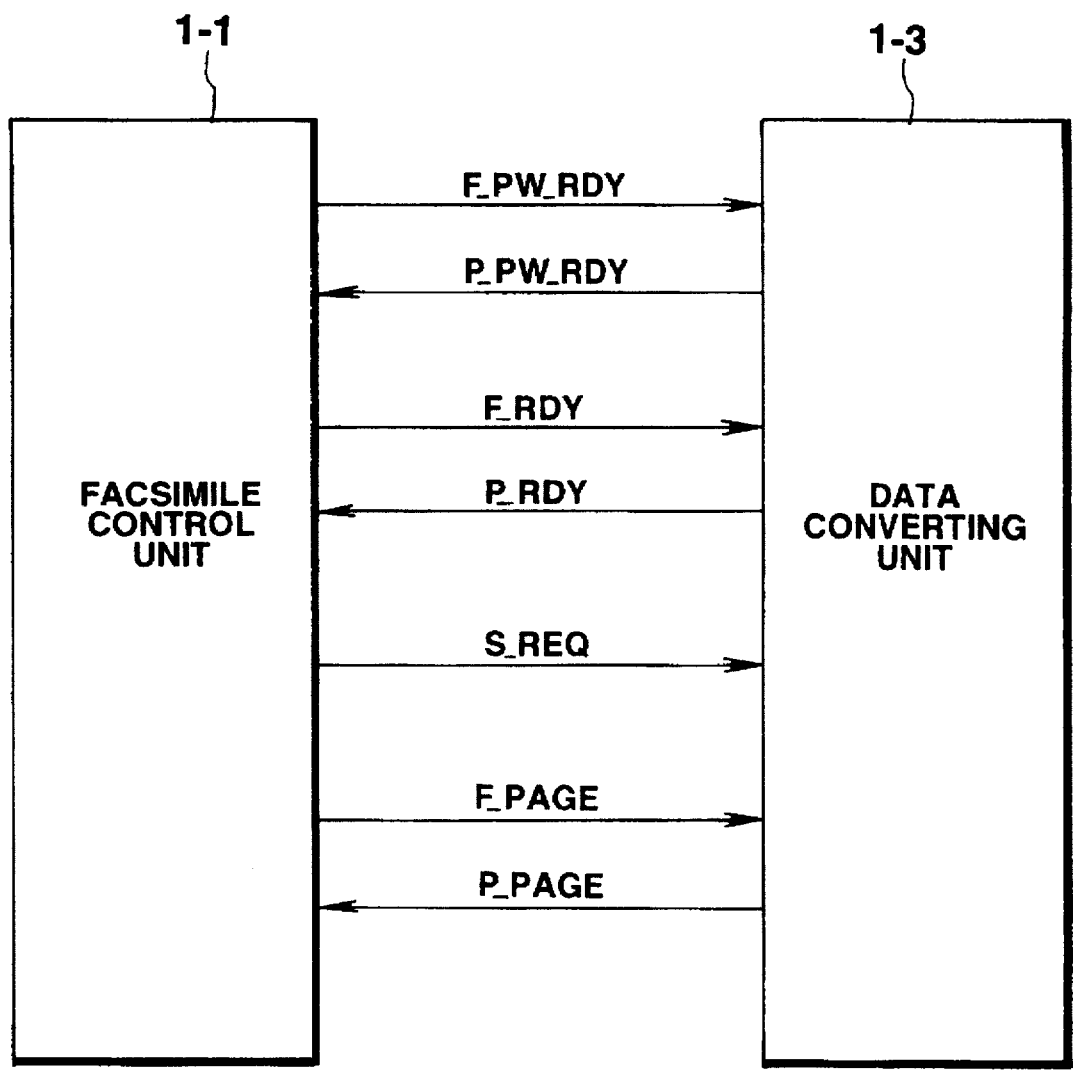
FIG. 32 is a view showing connecting condition between the facsimile control unit and the data converting unit.

FIG. 32 is a view showing signals to be communicated between the control unit 1-1 and the data converting unit 1-3.

A signal P-PW-RDY shows that a power is supplied to the data converting unit 1-3, and that the system is being operated.

A signal P-RDY shows that the data converting unit 1-3 is in standby condition, and that the data converting unit 1-3 is able to respond to a request from the facsimile control unit 1-1.

A signal P-PAGE is set to be a plus value while the data converting unit 1-3 is sending a page of image data to the facsimile control unit 1-1. The facsimile control unit 1-1 recognizes an end of the page by detecting that the signal P-PAGE is changed to a minus value from the plus value.

A signal F-PW-RDY shows that a power is supplied to the facsimile control unit 1-1, and that the system is being operated.

A signal F-RDY shows that the facsimile control unit 1-1 is in the standby condition, and that the facsimile control unit 1-1 is able to respond to a request from the data converting unit 1-3.

A signal F-PAGE is set to be a plus value while the facsimile control unit 1-1 is sending a page of image data to the data converting unit 1-3. The data converting unit 1-3 recognizes an end of the page by detecting that the signal F-PAGE is changed to a minus value from the plus value.

A signal S-REQ is a request signal for causing the data converting unit 1-3 to send a polling command to the facsimile control unit 1-1, when the facsimile control unit 1-1 has some trouble and informs the data converting unit 1-3 of that, or when the facsimile control unit 1-1 requests some operation to the data converting unit 1-3 etc. The signal S-REQ is provided so that the facsimile control unit 1-1 is able to require some operation of the data converting unit 1-3.

Next, modification in facsimile reception will be described as follows.

In the embodiment described above, the PC/FAX switching function is operated in accordance with a predetermined mode. But for example, in a case where an available area of the storage memory 2-11 becomes less than the predetermined value in the facsimile reception, the apparatus might be modified to perform the output control of received image data regardless of the PC/FAX switching mode. While the facsimile control unit 1-1 is performing a receiving control, the facsimile control unit 1-1 checks an amount of available area of the storage memory 2-11. If the amount of the available area becomes less than a predetermined value, the facsimile control unit 1-1 sets an image output flag. In that case, the facsimile control unit 1-1 continues to perform the receiving control. Usually, the apparatus performs a recording control of received image data in accordance with the PC/FAX switching mode. But, in a case where the image output flag has been set in the receiving control, the apparatus performs a recording control of received image data in accordance with the facsimile priority mode of the PC/FAX switching mode so as to prevent a communication error by a memory overflow of the storage memory 2-11. Thereby, the apparatus starts the output control of received image data early, and releases a memory area early so as to prevent the memory overflow of the storage memory 2-11.

The apparatus according to this embodiment might be modified to switch recording sheet cassettes in accordance with the output mode (i.e. the output operation of image data received by the facsimile control unit 1-1 and the output operation of data from the host 1-5). In this case, the printing unit 1-4 has plural recording sheet cassettes.

The apparatus presets recording sheet cassettes corresponding to each data to be printed. The recording sheet cassettes might be set separately, and one recording sheet cassette might be set in two modes. By presetting cassettes, for example, the apparatus can print received image data on recycled paper and print data from the host 1-5 on high-quality paper. Further, by using plural color papers, the apparatus can print the received image data and the data from the host 1-5 on different color papers. Further, since recording sheet cassettes for received image data are provided, a shift to memory image reception because of no paper can be prevented.

The recording control of image data is started by a recording start request from the data converting unit to the printing unit 1-4. The data converting unit 1-3 determines an attribute of the image data to be printed, and selects a recording sheet cassette corresponding to the attribute of the image data.

After selecting the cassette, the data converting unit 1-3 sends a setting command of the recording sheet cassette to the printing unit 1-4. The printing unit 1-4 causes the paper supplying unit control 5-14 to supply paper from the recording sheet cassette, and performs the recording control.

The apparatus might be modified to switch discharge units in paper discharge unit 5-16 in accordance with the output mode of image data 1-1, and data from the host 1-5. The paper discharge unit 5-16 has plural discharge units for papers and so can function as a paper sorter.

The apparatus presets discharge units corresponding to each data to be printed. Thereby it is easy to distinguish printed data. The recording control of image data is started by a recording request from the data converting unit 1-3 to the printing unit 1-4. The data converting unit 1-3 determines an attribute of image data to be printed and information of a sending station (a calling station) or an operator of the host 1-5 etc. and selects a discharge unit on the basis of the determination. After selecting the discharge unit, the data converting unit 1-3 sends a setting command for the discharge units to the printing unit 1-4. The printing unit 1-4 performs the recording control, and discharges a printed paper to the discharge unit in accordance with the setting command from the data converting unit 1-3.

In the embodiment described above, the data converting unit 1-3 selects data to be printed because printing by the printing unit 1-4 is performed through the data converting unit 1-3.

However, plural data routes might be provided for printing data. For example, while the host 1-5 is sending data to be printed to the data converting unit 1-3, the facsimile control unit 1-1 sends image data to the printing unit 1-4 through the video I/F 2-14 directly connected to the printing unit 1-4, and the facsimile control unit 1-1 controls a recording operation of received image data.

In a case where the host 1-5 sends data to the data converting unit 1-3, the data converting unit 1-3 sets the signal P-RDY to be "0". In this case, the data converting unit 1-3 does not accept a recording start request from the facsimile control unit 1-1 because the data converting unit is being operated in response to the request from the host 1-5. The data from the host 1-5 to be printed is sequentially transferred to the data converting unit 1-3, and is converted to a bit map image in accordance with font data in the ROM 2-4. After receiving a page command from the host 1-5, the data converting unit 1-3 starts a recording control of the printing unit 1-4. In a case where the facsimile control unit 1-1 performs a recording control while the host 15 is sending data to the data converting unit 1-3, the facsimile control unit 1-1 checks whether the printing unit 1-4 is being used or not. If the printing unit 1-4 is not being used, the facsimile control unit 1-1 sends image data to the printing unit 1-4 through the video I/F 2-4 and the video I/F 5-2 directly, and starts a recording control. Thereby, a movable ratio of the printing unit 1-4 is improved. Further, by switching discharge units, the apparatus can perform time sharing printing with high efficiency.

In the PC/FAX automatic switching mode of the receiving control described above, the apparatus performs the recording control by an interrupt control in page units, and after finishing the interrupt process, the apparatus restarts the suspended recording control. However, that process might be modified. For example, it might be modified to suspend the recording control after accepting a request of the interrupt control in page units. Further, the timing of releasing a memory area, and the timing of starting the output operation of the received image data, might be modified.

Next, modification of the facsimile transmission of the data from the host 1-5 under the control by the host 1-5 is described as follows.

In a case where the host 1-5 sends the information data (e.g. telephone number, name) to the facsimile control unit, the transmission might be modified so that the host 1-5 sends the information data to the facsimile control unit 1-1 through a RS interface directly without going through the data converting unit 1-3.

In a case where the data from the host 1-5 is sent through the data converting unit 1-3 by the facsimile control unit 1-1, the data converting unit 1-3 might cause the printing unit 1-4 to print the data to be sent in parallel.

In the embodiment described above, the host 1-5 indicates each kind of data to be sent from the host to the data converting unit 1-.3. But, the data converting unit 1-3 might analyze data from the host 1-5, and might select either converting data into a bit map image and causing the printing unit 1-4 to record it, converting data into a bit map image and causing the facsimile control unit 1-1 to send it, or transferring data (the information data) to the facsimile control unit 1-1 without converting it into a bit map image.

The data converting unit 1-3 might convert the format of the information data from the host 1-5 into a format as same as data input from the operation unit 2-8 of the facsimile control unit 1-1.

The data converting unit 1-3 might cause the printing unit 1-4 to print the image data to be sent with the information data (e.g. telephone number, destination, name).

Next, modifications of the copy operation will be described as follows.

In the embodiment described above, the facsimile control unit 1-1 reads a document, codes read image data, stores code data, decodes stored code data, and sends decoded image data to the data converting unit 1-3 in page units, and the data converting unit 1-3 causes the printing unit 1-4 to print the image data in page units. But the copy operation might be performed in accordance with following processes.

(1) The facsimile control unit 1-1 performs reading and transferring controls in line units, and performs a process of storing the read image data into the storage memory 2-11 and a process of transferring the stored image data to the data converting unit 1-3 in parallel.

(2) The facsimile control unit 1-1 directly sends read image data to the data converting unit 1-3 without coding and storing the read image data.

(3) The facsimile control unit 1-1 stores read image data (raw data) into the storage memory 2-11 without coding the read image data.

(4) The facsimile control unit 1-1 sends read image data to the data converting unit 1-3 without storing the read image data into the storage memory 2-11, and the data converting unit 1-3 or the host 1-5 stores the read image data into the memory.

(5) The facsimile control unit 1-1 sends code data to the data converting unit 1-3 or the host 1-5. Then the data converting unit 1-3 or the host 1-5 converts the code data into a bit map image.

Further, in a case where the apparatus discriminates whether or not to perform a printing control in page order, and where the apparatus stores image data, the apparatus might perform following processes.

(1) The host 1-5 stores all of the read image data instead of the facsimile control unit 1-1.

(2) The facsimile control unit 1-1 stores read image data into the storage memory 2-11 until a page number of read image data reaches a predetermined value and the host 1-5 stores pages of image data thereafter.

(3) The facsimile control unit 1-1 stores read image data into the storage memory 2-11 until an amount of read image data reaches a predetermined value, and the host 1-5 stores image data thereafter.

(4) Usually, the apparatus stores a first page of the bit map image into the memory 4-7. But, in a case where a printing control in page order is instructed by the facsimile control unit 1-1 or the host 1-5, the apparatus stores all pages of the bit map image into the memory 4-7 in accordance with an indicated method by the facsimile control unit 1-1 or the host 1-5, and after that, when the document has plural pages, the apparatus performs the printing control in page order.

(5) The apparatus has a structure for detecting the number of pages in the documents, and when the document is one page, the apparatus converts read image data into a bit map image, and stores the bit map image into the memory 4-7. On the other hand, when the document has plural pages, the apparatus stores the read image data into a memory in accordance with one of the storage methods (1) through (3) mentioned above.

(6) In a case where a printing control in page order is set, and where it is not sure whether the document is one page or not, the apparatus stores a first page into the memory 4-7. Then if a next page exists, the apparatus does not perform a printing operation of the image data in the memory 4-7, and continues the storage process in accordance with one of the storage methods (1) through (3) mentioned above.

(7) In the process (6) mentioned above, the apparatus performs the converting process of the first page and the storage process in parallel.

Next, a process to be performed in response to a request from the host 1-5 or a request of facsimile reception during the copy operation will be described as follows.

The apparatus has a facsimile priority mode and a printer priority mode, and performs different processes in accordance with the set mode.

(A) Facsimile priority mode

In this mode, the data converting unit 1-3 does not accept a printing request from the host 1-5. In a case where the facsimile control unit 1-1 receives a request for facsimile reception during the copy operation, the apparatus suspends the copy operation after finishing printing the page, and performs a receiving control and a recording control of received image data. If the apparatus is set to perform memory reception; the facsimile control unit 1-1 stores received image data into the storage memory 2-11. The apparatus might be modified to perform the copy operation and the memory reception in parallel.

(B) Printer priority mode

In this mode, the data converting unit 1-3 accepts a printing request from the host 1-5. The apparatus suspends the copy operation after finishing printing the page in response to the printing request from the host 1-5, and performs a printing process of data from the host 1-5. After finishing printing the data from the host 1-5, the apparatus restarts the suspended copy operation. The apparatus performs facsimile reception during the copy operation as in the facsimile priority mode.

Further, the apparatus performs a copy operation in response to an instruction from the host 1-5, too.

In the embodiment described above, the facsimile control unit 1-1 clears the image data stored in the storage memory 2-11 after finishing printing the image data. But the facsimile control unit 1-1 might clear the image data after finishing transferring the image data.

Next, modifications of the transferring/transmitting operation of read image data under control of the host 1-5 will be described as follows.

In the transmitting operation, the host 1-5 might directly send the information data (e.g. telephone number, destination name) and function data (e.g. broadcasting transmission, confidential transmission) to the facsimile control unit 1-1 via the RS interface without passing via the data converting unit 1-3.

Further, in the transmitting operation, the data converting unit 1-3 might analyze commands from the host 1-5, and send commands to the facsimile control unit 1-1 in accordance with the analysis.

In the transmitting operation, the information data and the function data might be input by a reading operation of the scanner 2-7 of the facsimile control unit 1-1 as image data.

In the transmitting operation of the read image data, the facsimile control unit 1-1 might send the read image data to be transmitted to the data converting unit 1-3, and the data converting until 1-3 might cause the printing unit 1-4 to print the read image data in parallel, or might send the read image data to the host 1-5.

In a case where the facsimile control unit 1-1 transmits the read image data in accordance with instructions from the host 1-5, the facsimile control unit 1-1 checks whether a page number of read image data equals a page number indicated by the host 1-5 or not, and informs the host 1-5 of the result of checking.

Next, modifications of the transferring operation of the received data to the host 1-5 will be described as follows.

In a case where the facsimile control unit 1-1 sends the received data to the host 1-5 through the data converting unit 1-3, the host 1-5 might periodically monitor the receiving condition of the facsimile control unit 1-1, and cause the facsimile control unit 1-1 to send the received data to the host 1-5 by a polling process.

In the embodiment described above, the apparatus sets the output mode corresponding to the destination (the sending station, the calling station) in the transferring operation of received data. But, the apparatus might set the output mode in accordance with a time or on-line condition of the host 1-5.

Next, modifications of the output operation of facsimile report data will be described as follows.

In the embodiment described above, the apparatus performs the output control in accordance with the set output mode. But, the apparatus might be modified to perform the output control of the facsimile report data in accordance with the request unit of the facsimile communication. For example, the apparatus discriminates whether the facsimile communication was performed in response to a request from the facsimile control unit 1-1, the data converting unit 1-3 causes the printing unit 1-4 to print the facsimile report data.

In a case where the facsimile control unit 1-1 communication was performed in response to a request from the host 1-5, the data converting unit 1-3 sends the facsimile report data to the host 1-5.

Further, the apparatus might be modified to automatically switch the output mode of the facsimile report data in accordance with a kind of the facsimile report data. For example, there are a communication result report which is composed of character data, and an error communication report which is composed of both character data and error image data as facsimile report data.

If the data converting unit 1-3 edits the error communication report, it is complicated to edit the error communication report because the report is composed of character data and image data. Therefore, the facsimile control unit 1-1 converts the error communication report into image data, and sends the image data to the data converting unit 1-3. On the other hand, the facsimile control unit 1-1 sends the communication result report of character data to the converting unit 1-3 without converting it into image data.

Next, a modification of the I/F unit 1-2 will be described as follows.

Figure 27:
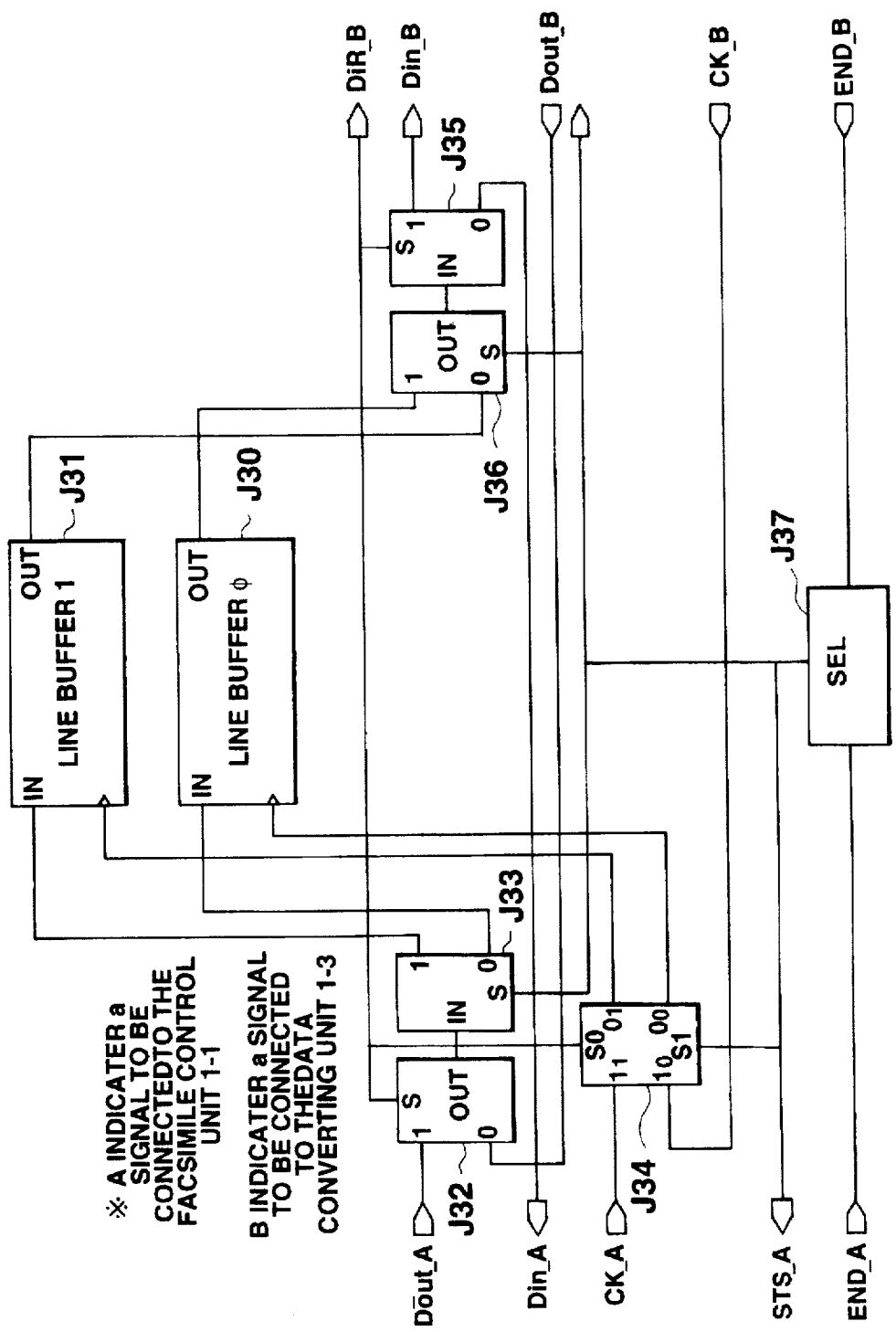
FIG. 27 is a block diagram showing a structure of a modification of the image data buffer in FIG. 3.

FIG. 27 is a block diagram showing a structure of the modification of the I/F unit 1-2.

In FIG. 27, two line buffers J30 and J31, which are structured as shift registers, are used instead of the registers 3-5 and 3-6 for communicating image data. The data converting unit 1-3 accesses one of those line buffers J30 and J31, and the facsimile control unit 1-1 accesses another line buffer. Then, the facsimile control unit 1-1 and the data converting unit 1-3 alternately switch those line buffers J30 and J31 each time a line of image data is communicated. Thereby, each unit can access those line buffers J30 and J31 at a high speed.

Each of the line buffers J30 and J31 is structured as a serial-in serial-out shift register having a line of memory capacity. Numerals J32 and J36 denote selectors having two inputs and an output. When a signal s is "1", each of selectors J32 and J36 outputs an input signal 1. When the signal s is "0", each of selectors J32 and J36 outputs an input signal 0.

Numerals J33 and J35 denote selectors having an input and two outputs. When a signal s is "1", each of selectors J33 and J35 fixes an output signal 0 and outputs an input signal as an output signal 1. When the signal s is "0", each of selectors J33 and J35 outputs the input signal as the output signal 0, and fixes the output signal 1.

Number J34 denotes a selector having two inputs and two outputs which are controlled by selecting signals s0 and s1. The selector J34 operates as in table 1 following.

TABLE 1

| s0 | s1 | output 00 | output 01 |
|----|----|-----------|-----------|
| 0  | 0  | input 10  | input 11  |
| 0  | 1  | input 11  | input 10  |
| 1  | 0  | input 11  | input 10  |
| 1  | 1  | input 10  | input 11  |

Figure 28:
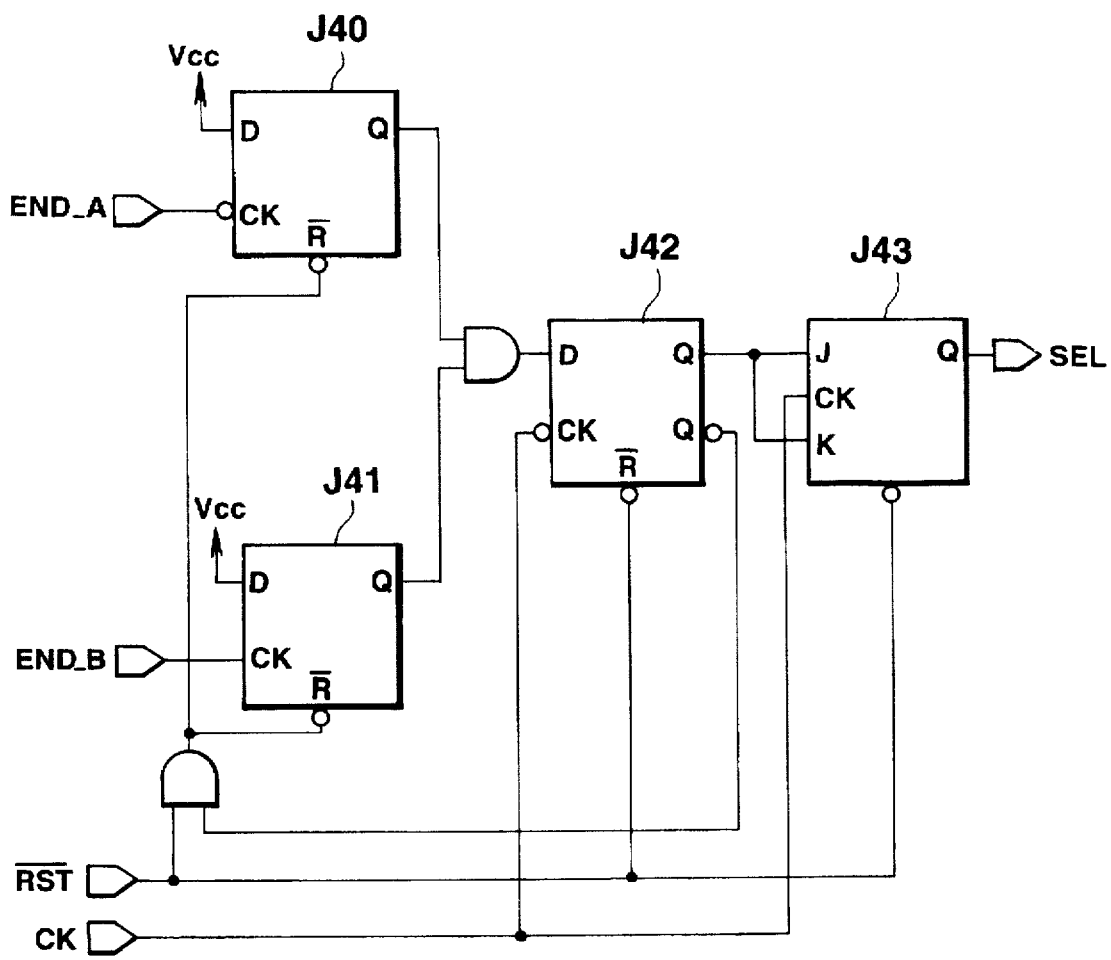
FIG. 28 is a block diagram showing a structure of a selecting control unit J37.
Figure 29:
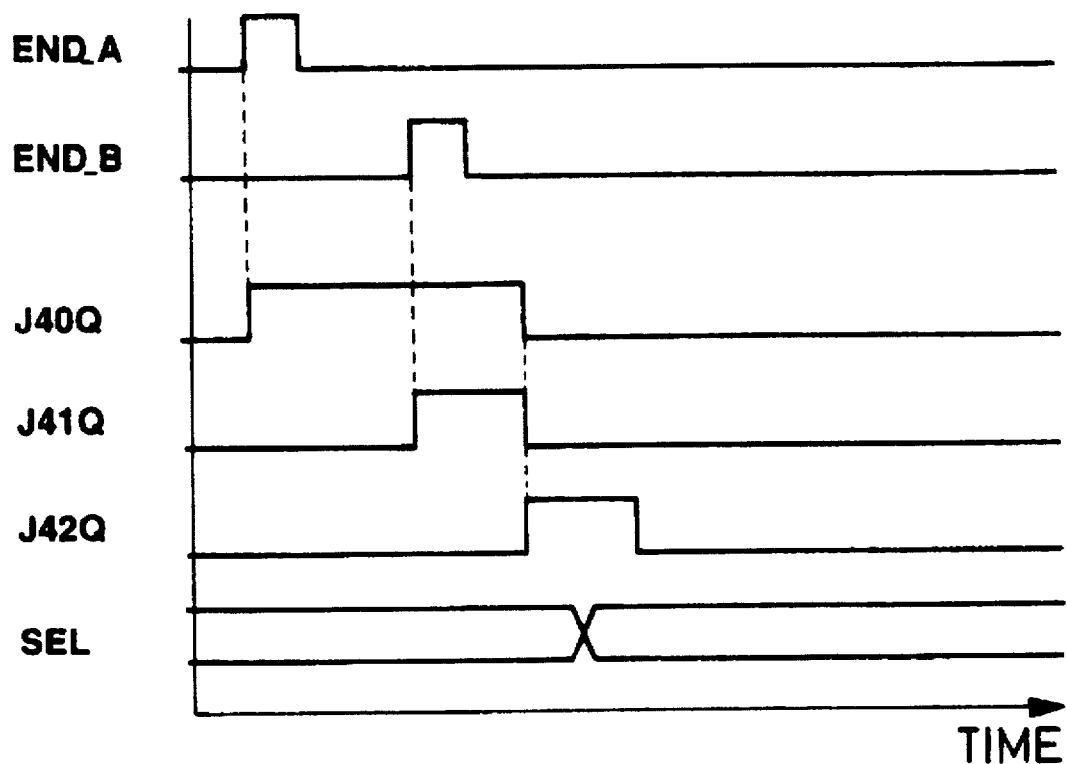
FIG. 29 is a timing chart showing an operation timing of the selecting control unit.

Numeral J37 denotes a selecting control unit for generating a selecting signal SEL, and the selecting signal SEL is reversed in response to an end pulse END-A or END-B which indicates an end of processing a line of image data. FIG. 28 is a block diagram showing a structure of the selecting control unit J37. FIG. 29 is a timing chart showing an operation timing of the selecting control unit J37.

Numeral D OUT-A or B denotes serial image data to be input to the selecting control unit J37.

Numeral D IN-A or B denotes serial image data to be output from the selecting control unit J37.

Numeral CK-A or B denotes a clock signal for inputting and outputting serial image data.

Numeral END-A or B denotes an end pulse indicating an end of processing a line.

Numeral STS-A or B denotes a monitor signal (the signal SEL) which is monitored by the facsimile control unit 1-1 or the data converting unit 1-3.

Numeral DIR-B denotes an input signal to decide a transferring direction of image data communication between the facsimile control unit 1-1 and the data converting unit 1-3.

Line buffers 0 and 1 operate on the basis of the signal DIR-B and the selecting signal SEL as a table 2 following.

TABLE 2

| DIR-B | SEL | line buffer 0 | line buffer 1 |
|-------|-----|---------------|---------------|
| 0 | 0 | input data from the unit 1-3 | output data to the unit 1-1 |
| 0 | 1 | output data to the 1-1 | input data from the unit 1-3 |
| 1 | 0 | input data from the unit 1-1 | output data from the unit 1-3 |
| 1 | 1 | output data to the unit 1-3 | input data from the unit 1-1 |

In FIG. 28, when the end pulse END-B from the data converting unit 1-3 and the end pulse END-A from the facsimile control unit 1-1 are input to the selecting control unit J37, a JK-flip-flop J43 reverses its output, and thereby the selecting signal SEL is reversed.

Figure 33:
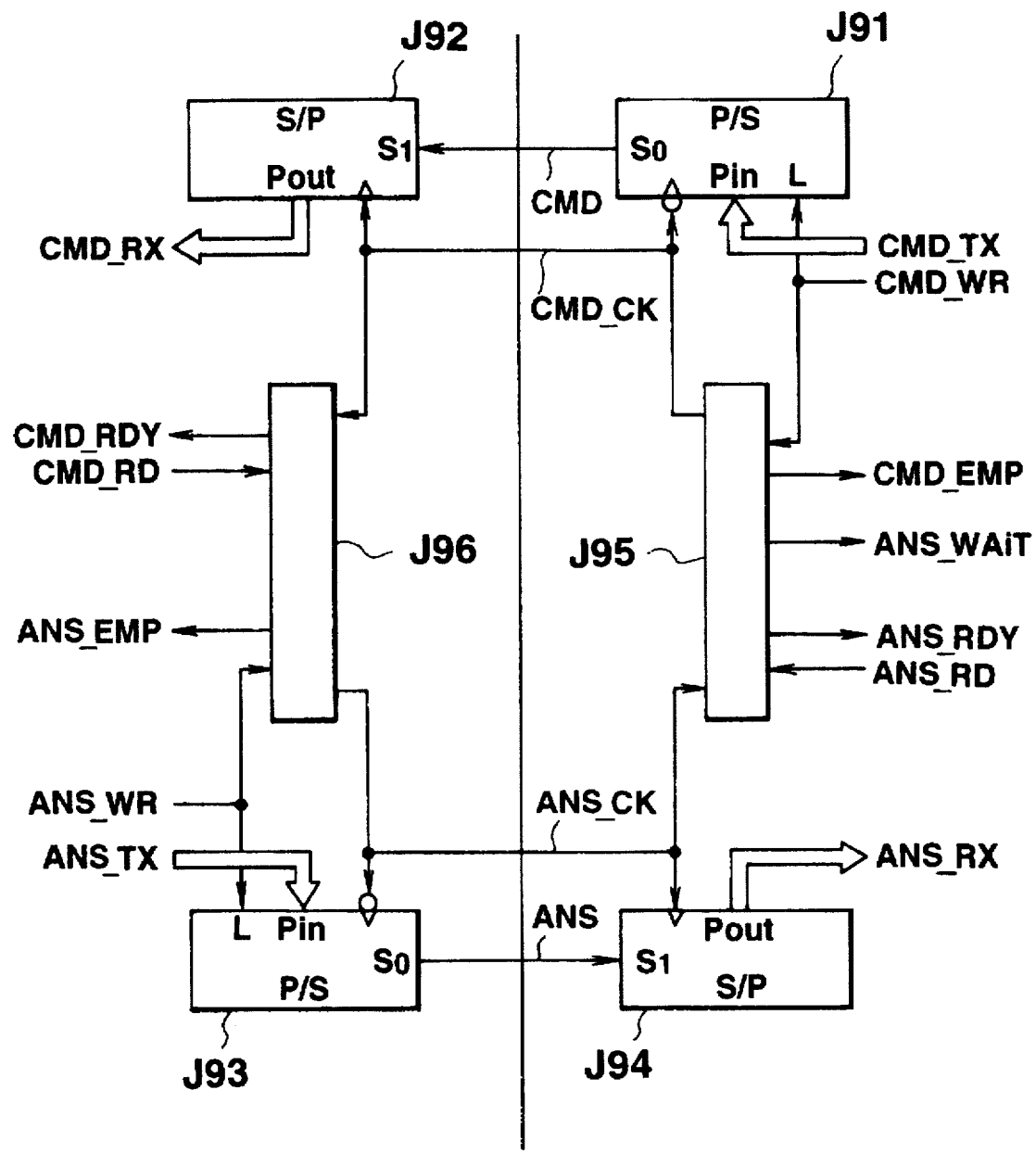
FIG. 33 is a block diagram showing a structure of a serial I/F for communicating commands and responses.

FIG. 33 is a block diagram showing a structure of a modification of the communication register for communicating a command and a response. In FIG. 33, a command and a response are serially communicated, and each of the data converting unit 1-3 and the facsimile control unit 1-1 have a serial-parallel converter (S/P converter) and a parallel-serial converter (P/S converter).

By the structure mentioned above, the structure connecting the data converting unit 1-3 and the facsimile control unit 1-1 becomes simple.

Numeral J91 denotes a P/S converter for converting a parallel command into a serial command.

Numeral J92 denotes a S/P converter for converting a received serial command into a parallel command.

Numeral J93 denotes a P/S converter for converting parallel response data into serial response data.

Numeral J94 denotes a S/P converter for converting received serial response data into parallel response data.

Numeral J95 denotes an I/F control unit of the data converting unit 1-3.

Numeral J96 denotes an I/F control unit of the facsimile control unit 1-1.

Numeral CMD-TX denotes parallel command data to be sent.

Numeral CMD-WR denotes a writing signal to the P/S converter J91.

Numeral CMD)-EMP denotes a signal showing condition of the P/S converter J91.

Numeral ANS-WAIT denotes a signal showing that response data has not been received yet.

Numeral ANS-RDY denotes a signal showing that response data has been received.

Numeral ANS-RD denotes a reading signal of received response data.

Numeral ANS-RX denotes response data converted to parallel data.

Numeral CMD denotes a signal of serial command data.

Numeral CMD-CK denotes a clock signal for serial command data.

Numeral ANS denotes a signal of serial response data.

Numeral ANS-CK denotes a clock signal for serial response data.

Numeral CMD-RX denotes command data converted to parallel data.

Numeral CMD-RDY denotes a signal showing that a command has been received.

Numeral ANS-EMP denotes a signal showing condition of the P/S converter J93.

Numeral ANS-WR denotes a writing signal of response data to the P/S converter J93.

Numeral ANS-TX denotes parallel response data.

Figure 34:
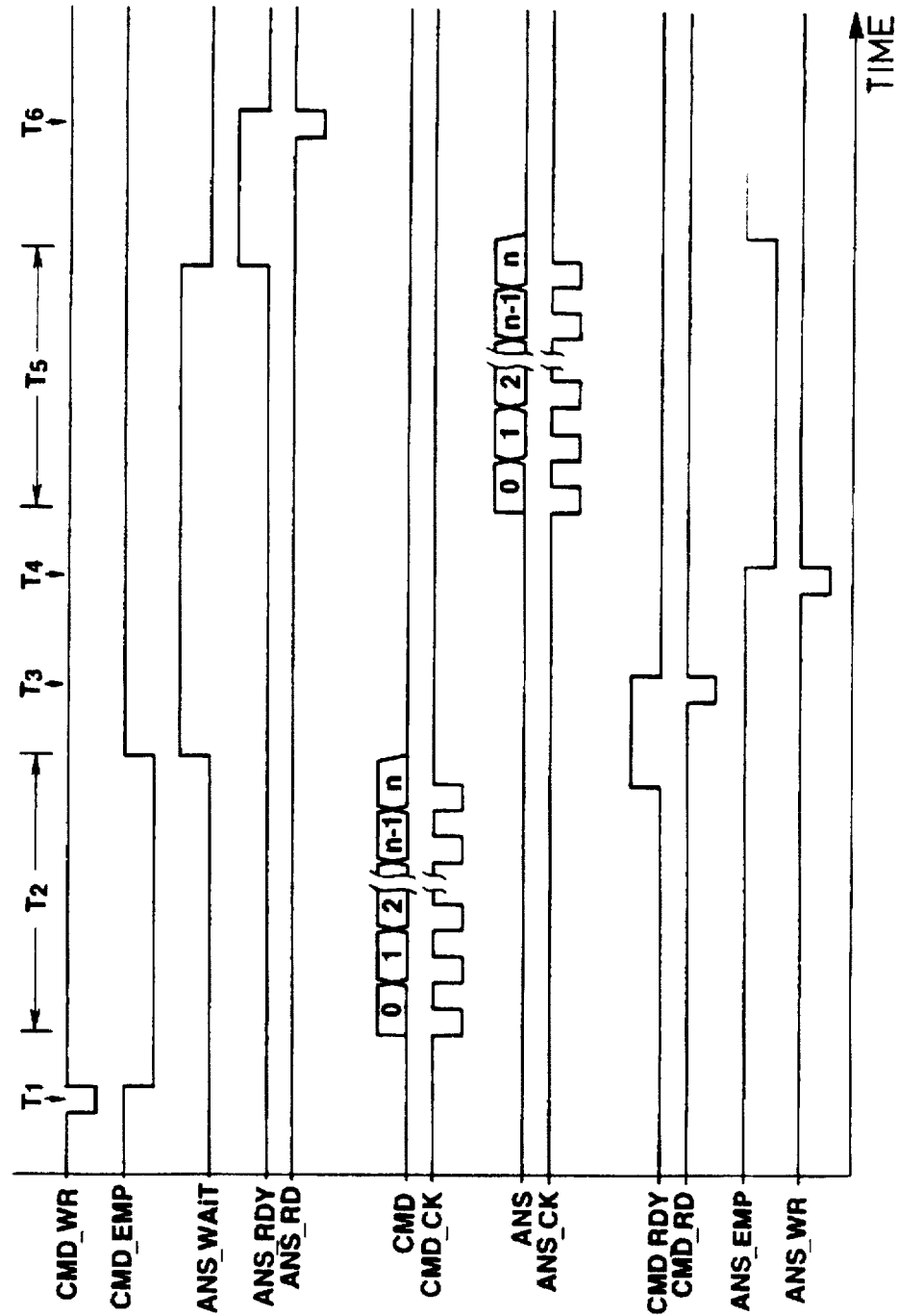
FIG. 34 is a timing chart showing an operation timing of the serial I/F.

FIG. 34 is a timing chart showing an operation timing of FIG. 33.

T1: The signal CMD-EMP changes to "0" by writing command data into the P/S converter J91.

T2: Serial data is output to the line CMD in response to an edge of the clock CMD-CK from high level to low level. When outputting of all bits is finished, the signal CMD-EMP returns to "1", and the signal ANS-WAIT becomes "1". On the other hand, the facsimile control unit 1-1 sets the signal CMD-RDY to be "1" after finishing receiving a predetermined bits of serial data by sampling.

T3: The signal CMD-RDY is returned to "0" by reading command data converted to parallel data by the signal CMD-RD.

T4: The signal ANS-EMP is changed to "0" by writing response data into the P/S converter J93.

T5: The signal ANS and the clock ANS-CK are output as the timing T2 described above. The signal ANS-EMP is returned to "1" by outputting predetermined bits. On the other hand, the data converting unit 1-3 sets the signal ANS-RDY to be "1" in response to receiving the predetermined bits, and the signal ANS-WAIT is returned to "0".

T6: The signal ANS-RDY is returned to "0" by reading response data converted parallel data.

As described above, the apparatus completes communicating a command and a response to the command.

The key data register and the display data register of FIG. 3, also, might be modified so as to use the P/S converters and S/P converters.

Further, by supplying display data and/or key data to P/S converters J91 and J93, the structure of FIG. 33 can be used in communicating plural kinds of data.

Although particular embodiments of the present invention are herein disclosed for purposes of explanation, various modifications thereof, after study of this specification, will be apparent to those skilled in the art of which the invention pertains.

We claim:

1. An image communication apparatus capable of being connected to a data processing terminal, comprising:

data communication means for communicating data via a communication link;

memory means for storing data received by said data communication means;

data converting means for converting received data from said data communication means and data received from the data processing terminal into bit map image data, said data converting means including sending means for sending data stored by said memory means to the data processing terminal;

data reproducing means for reproducing the bit map image data, and control means for controlling a receiving operation by said data communication means, a storage operation of the received data into said memory means and a sending operation of the stored data to the data processing terminal, wherein, in a case where the data processing terminal is able to receive data from said sending means, said control means performs the receiving operation, the storage operation and the sending operation in an absence of a data transfer request from the data processing terminal, and, in a case where the data processing terminal is not able to receive data from said sending means, said control means controls the receiving operation and the storage operation, but not the sending operation.

2. An image communication apparatus according to claim 1, further comprising first setting means for setting a reproducing mode to reproduce the bit map image data by said data reproducing means and second setting means for setting a sending mode to send the stored data to the data processing terminal, wherein, in a case where the reproducing mode is set, said control means causes said data reproducing means to reproduce the bit map image data, and, in a case where the sending mode is set, said control means causes said sending means to send the stored data to the data processing terminal.

3. An image communication apparatus according to claim 2, wherein the reproducing mode and the sending mode are independently set.

4. An image communication apparatus according to claim 3, wherein said control means sets first information indicating the reproducing mode for the bit map image data, and causes said data reproducing means to reproduce the bit map image data in accordance with the first information.

5. An image communication apparatus according to claim 3, wherein said control means sets second information indicating the sending mode for the stored data, and causes said sending means to send the stored data in accordance with the second information.

6. A data converting method in an image communication apparatus to which a data processing terminal is connectable, comprising the steps of:

receiving data via a communication link;

storing the received data into a memory;

converting image data received in data communication from a destination into bit map image data using a data converting unit;

converting data from the data processing terminal into bit map image data using the data converting unit;

reproducing the bit map image data using a data reproducing unit;

determining whether or not the data processing terminal is able to receive data; and sending the stored data to the data processing terminal in accordance with the determination even in an absence of a data transfer request from the data processing terminal, wherein in a case where the data processing terminal is not able to receive data, the stored data is maintained in the memory.

7. A method according to claim 6, further comprising the steps of:

setting a reproducing mode to reproduce the bit map image data;

setting a sending mode to send the stored data to the data processing terminal, and reproducing the bit map image data in accordance with whether or not the reproducing mode has been set, wherein said sending step sends the stored data in accordance with whether or not the sending mode is set.

8. A method according to claim 7, wherein the reproducing mode and the sending mode are independently set.

9. A method according to claim 7, further comprising the step of setting first information indicating the reproducing mode for the bit map image data in a case where the reproducing mode has been set, wherein the reproducing step reproduces the bit map image data in accordance with the first information.

10. A method according to claim 7, further comprising the step of setting second information indicating the sending mode for the stored data in a case where the sending mode has been set, wherein said sending step sends the stored data to the data processing terminal in accordance with the second information.

11. A data communication apparatus capable of being connected to a data processing terminal, comprising:

data receiving means for receiving data via a communication link;

memory means for storing the received data;

data converting means for converting received data from said data receiving means and data received from the data processing terminal into bit map image data, said data converting means including sending means for sending data stored by said memory means to the data processing terminal;

data reproducing means for reproducing the bit map image data;

first setting means for setting a reproducing mode to reproduce the bit map image data;

second setting means for setting a sending mode to send the stored data to the data processing terminal; and control means for determining whether or not the data processing terminal is able to receive data, and for controlling a receiving operation by said data receiving means, a storage operation of the received data into said memory means, a reproducing operation of the bit map image data by said reproducing means and a sending operation of the stored data to the data processing terminal, in accordance with modes set by said first and second setting means and a determination of whether or not the data processing terminal is able to receive data even in an absence of a data transfer request from the data processing terminal.

12. A data communication apparatus according to claim 11, wherein in a case where the sending mode has been set and where the data processing terminal is not able to receive data, said control means performs the receiving operation and the storage operation such that the stored data is maintained in said memory means.

13. A data communication apparatus according to claim 12, wherein in a case where the sending mode has been set and where the data processing terminal is able to receive data, said control means performs the receiving operation, the storage operation and the sending operation.

14. A data communication apparatus according to claim 13, wherein in a case where the reproducing mode has been set, said control means causes said reproducing means to reproduce the bit map image data.

15. A data communication apparatus according to claim 14, wherein said control means sets first information indicating the reproducing mode for the bit map image data in a case where the reproducing mode has been set, and causes said reproducing means to reproduce the bit map image data in accordance with the first information.

16. A data communication apparatus according to claim 13, wherein said control means sets second information indicating the sending mode for the stored data in a case where the sending mode has been set, and causes said sending means to send the stored data to the data processing terminal in accordance with the second information.

17. A data communication apparatus according to claim 11, wherein the reproducing mode and the sending mode are independently set.

* * * * *

UNITED STATES PATENT AND TRADEMARK OFFICE
CERTIFICATE OF CORRECTION

PATENT NO. : 5,726,768

DATED : March 10, 1998

INVENTOR(S): YUJI ISHIKAWA ET AL.

It is certified that error appears in the above-identified patent and that said Letters Patent is hereby corrected as shown below:

COLUMN 9
  Line 56, "(Fig. (e))" should read --(Fig. 10(e))--.

COLUMN 13
  Line 17, "plurals" should read --plural--.

COLUMN 28
  Line 58, "CMD)-EMP" should read --CMD-EMP--.

COLUMN 30
  Line 13, "controls" should read --performs--.

Signed and Sealed this

Eighth Day of September, 1998

Attest:

BRUCE LEHMAN

Attesting Officer     Commissioner of Patents and Trademarks